United States Patent
Jiang

(10) Patent No.: US 10,630,719 B2
(45) Date of Patent: Apr. 21, 2020

(54) SDN-BASED DDOS ATTACK PREVENTION METHOD, APPARATUS, AND SYSTEM

(71) Applicant: Huawei Technologies Co., Ltd., Shenzhen (CN)

(72) Inventor: Wu Jiang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 96 days.

(21) Appl. No.: 15/711,725

(22) Filed: Sep. 21, 2017

(65) Prior Publication Data

US 2018/0013787 A1 Jan. 11, 2018

Related U.S. Application Data

(63) Continuation of application No. PCT/CN2016/072781, filed on Jan. 29, 2016.

(30) Foreign Application Priority Data

Mar. 24, 2015 (CN) .......................... 2015 1 0131608

(51) Int. Cl.
*H04L 29/06* (2006.01)
*H04L 12/26* (2006.01)
(Continued)

(52) U.S. Cl.
CPC .......... *H04L 63/1458* (2013.01); *H04L 29/06* (2013.01); *H04L 43/16* (2013.01);
(Continued)

(58) Field of Classification Search
CPC ..... H04L 63/1458; H04L 29/06; H04L 43/16; H04L 45/64; H04L 63/1425
See application file for complete search history.

(56) References Cited

U.S. PATENT DOCUMENTS 7,436,770 B2* 10/2008 Sterne ................. H04L 63/0227
370/235
9,282,116 B1* 3/2016 Rovniaguin ........ H04L 63/1458
(Continued)

FOREIGN PATENT DOCUMENTS

| CN | 101018156 A | 8/2007 |
|----|-------------|--------|
| CN | 101827039 A | 9/2010 |

(Continued)

OTHER PUBLICATIONS

Machine Translation and Abstract of Chinese Publication No. CN101018156, Aug. 15, 2007, 16 pages.
(Continued)

*Primary Examiner* — Yonas A Bayou
(74) *Attorney, Agent, or Firm* — Conley Rose, P.C.

(57) ABSTRACT

A software defined networking (SDN)-based distributed denial of service (DDoS) attack prevention method, an apparatus, and a system, where a controller delivers a traffic statistics collection instruction to a first packet forwarding device. The traffic statistics collection instruction instructs the first packet forwarding device to perform traffic statistics collection, and carries a destination Internet Protocol (IP) address. The controller collects statistical data reported by the first packet forwarding device, obtains, according to the statistical data, a statistical value of global traffic flowing to the destination IP address, and delivers a DDoS prevention policy to a second packet forwarding device based on a determining result that the statistical value of the global traffic exceeds the preset threshold. Correspondingly, the second packet forwarding device receives the DDoS prevention policy from the controller, and performs, according to the DDoS prevention policy, prevention process on the traffic flowing to the destination IP address.

20 Claims, 18 Drawing Sheets

(51) Int. Cl.
*H04L 12/715* (2013.01)
*H04L 12/771* (2013.01)

(52) U.S. Cl.
CPC .......... *H04L 45/64* (2013.01); *H04L 63/1425* (2013.01); *H04L 43/0876* (2013.01); *H04L 45/56* (2013.01); *H04L 63/0254* (2013.01); *H04L 63/20* (2013.01)

(56) References Cited

U.S. PATENT DOCUMENTS

| | | | | |
|---|---|---|---|---|
| 9,460,386 | B2* | 10/2016 | Fan | G06N 3/08 |
| 9,609,017 | B1* | 3/2017 | Gilbert | H04L 63/1458 |
| 2012/0159634 | A1* | 6/2012 | Haikney | G06F 21/53 |
| | | | | 726/25 |
| 2012/0216282 | A1* | 8/2012 | Pappu | H04L 63/1416 |
| | | | | 726/23 |
| 2013/0060940 | A1* | 3/2013 | Koponen | H04L 12/4633 |
| | | | | 709/225 |
| 2013/0070762 | A1* | 3/2013 | Adams | H04L 49/70 |
| | | | | 370/389 |
| 2013/0160008 | A1* | 6/2013 | Cawlfield | G06F 9/45558 |
| | | | | 718/1 |
| 2013/0198845 | A1* | 8/2013 | Anvari | G06F 21/85 |
| | | | | 726/25 |
| 2013/0219043 | A1* | 8/2013 | Steiner | G06F 9/4856 |
| | | | | 709/224 |
| 2013/0263256 | A1* | 10/2013 | Dickinson | H04L 63/1416 |
| | | | | 726/22 |
| 2013/0329734 | A1* | 12/2013 | Chesla | H04L 45/74 |
| | | | | 370/392 |
| 2014/0204957 | A1* | 7/2014 | Kanda | H04L 47/10 |
| | | | | 370/431 |
| 2014/0283051 | A1* | 9/2014 | Doron | H04L 63/1458 |
| | | | | 726/23 |
| 2015/0058977 | A1* | 2/2015 | Thompson | H04L 63/1416 |
| | | | | 726/22 |
| 2015/0095969 | A1* | 4/2015 | Jain | H04L 63/1458 |
| | | | | 726/1 |
| 2015/0229661 | A1* | 8/2015 | Balabine | H04L 43/04 |
| | | | | 726/22 |
| 2015/0236968 | A1* | 8/2015 | Zhang | H04L 63/1416 |
| | | | | 370/230 |
| 2016/0036837 | A1* | 2/2016 | Jain | H04L 63/1416 |
| | | | | 726/23 |
| 2016/0099964 | A1* | 4/2016 | Htay | H04L 63/1425 |
| | | | | 726/23 |
| 2016/0261628 | A1* | 9/2016 | Doron | H04L 63/1458 |

FOREIGN PATENT DOCUMENTS

| | | | |
|---|---|---|---|
| CN | 101883078 | A | 11/2010 |
| CN | 101827039 | B | 3/2013 |
| CN | 103685057 | A * | 3/2014 |
| CN | 103685057 | A | 3/2014 |
| EP | 1364297 | B1 | 12/2010 |
| WO | 0221279 | A1 | 3/2002 |

OTHER PUBLICATIONS

Machine Translation and Abstract of Chinese Publication No. CN101883078, Nov. 10, 2010, 23 pages.
Machine Translation and Abstract of Chinese Publication No. CN103685057, Mar. 26, 2014, 28 pages.
Foreign Communication From a Counterpart Application, PCT Application No. PCT/CN2016/072781, English Translation of International Search Report dated Apr. 28, 2016, 2 pages.
Foreign Communication From a Counterpart Application, PCT Application No. PCT/CN2016/072781, English Translation of Written Opinion dated Apr. 28, 2016, 6 pages.
Foreign Communication From a Counterpart Application, European Application No. 16767630.3, Extended European Search Report dated Dec. 22, 2017, 12 pages.
Machine Translation and Abstract of Chinese Publication No. CN101827039, Sep. 8, 2010, 21 pages.
Foreign Communication From a Counterpart Application, Chinese Application No. 201510131608.2, Chinese Office Action dated Apr. 1, 2019, 7 pages.
Giotis, K., et al., "Combining OpenFlow and sFlow for an effective and scalable anomaly detection and mitigation mechanism on SDN environments," XP028633283, Computer Networks, vol. 62, Apr. 7, 2014, pp. 122-136.
Foreign Communication From a Counterpart Application, European Application No. 16767630.3, European Office Action dated Apr. 24, 2019, 8 pages.

* cited by examiner

SDN-BASED DDOS ATTACK PREVENTION METHOD, APPARATUS, AND SYSTEM

CROSS-REFERENCE TO RELATED APPLICATIONS

This application is a continuation of International Patent Application No. PCT/CN2016/072781 filed on Jan. 29, 2016, which claims priority to Chinese Patent Application No. 201510131608.2, filed on Mar. 24, 2015. The disclosures of the aforementioned applications are hereby incorporated by reference in their entireties.

TECHNICAL FIELD

The present disclosure relates to communications technologies, and in particular, to a software defined networking (SDN)-based distributed denial of service (DDoS) attack prevention method, an apparatus, and a system.

BACKGROUND

FIG. 1 is a schematic diagram of a DDoS attack. Referring to FIG. 1, a primary implementation principle of a DDoS attack is that an attacker uses one or more main control hosts as a jump host to control massive infected controlled hosts in order to establish an attack network to implement a large-scale denial-of-service attack on a victim host. The attack may usually enlarge, in a form of grade, an attack result of a single attacker, causing severe impact on the victim host and resulting in serious network congestion. In the DDoS attack, the attack network is used to launch, on the victim host, multiple types of attacks such as an Internet Control Message Protocol (ICMP) flood attack, a synchronous (SYN) flood attack, and a User Datagram Protocol (UDP) flood attack. As a result, the victim host consumes a large quantity of processing resources to process these burst requests and cannot normally respond to an authorized user request, causing breakdown.

In a DDoS prevention solution in other approaches, a cleaning device is generally deployed at a network convergence node, and DDoS attack traffic converged at the node is cleaned using the cleaning device, thereby implementing DDoS prevention. The network convergence node may be an interworking gateway, an egress device of a metropolitan area network in China, an egress device of a data center, or the like. However, for a backbone network without an obvious network convergence node, there is a relatively large quantity of nodes in the network. In this case, in other approaches, a cleaning device is generally deployed for a specific Internet Protocol (IP) address, that is, the cleaning device is deployed on a traffic convergence node connected to a host having the specific IP address. The specific IP address may be set according to a customer requirement and a customer priority. For example, if a customer needs to protect an IP address or an IP address segment of a server, a traffic convergence node connected to the server is used as a node on which the cleaning device is deployed.

In the foregoing scenario of the backbone network without an obvious convergence node, although a cleaning device is deployed for a specific IP address, when a DDoS attack occurs, no matter whether an IP address of a victim host is the specific IP address, DDoS attack traffic for the victim host needs to be diverted to the cleaning device. In this case, the traffic of the victim host whose IP address is not the specific IP address can be diverted to the cleaning device only after passing through multiple routing and forwarding nodes in the network. As a result, network resources of these routing and forwarding nodes are occupied, impact of the DDoS attack on the backbone network is increased, and network security is reduced.

SUMMARY

The present disclosure provides an SDN-based DDoS attack prevention method, an apparatus, and a system in order to improve network security.

A first aspect of the present disclosure provides an SDN-based DDoS attack prevention method, including delivering, by a controller, a traffic statistics collection instruction to a first packet forwarding device, where the traffic statistics collection instruction is used to instruct the first packet forwarding device to perform traffic statistics collection, where the traffic statistics collection instruction carries a destination IP address, collecting, by the controller, statistical data reported by the first packet forwarding device according to the traffic statistics collection instruction, where the statistical data includes statistical information of traffic flowing to the destination IP address, obtaining, by the controller according to the statistical data, a statistical value of global traffic flowing to the destination IP address, where the statistical value of the global traffic indicates a statistical value that is used to reflect traffic flowing to the destination IP address within a range of the SDN and that is obtained after the controller summarizes statistical data reported by at least two packet forwarding devices including the first packet forwarding device, determining, by the controller, whether the statistical value of the global traffic exceeds a preset threshold, and delivering a DDoS prevention policy to a second packet forwarding device based on a determining result that the statistical value of the global traffic exceeds the preset threshold.

With reference to the first aspect, in a first possible implementation of the first aspect, the traffic statistics collection instruction further carries a detection start time, where the detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period.

With reference to the first possible implementation of the first aspect, in a second possible implementation of the first aspect, the method further includes determining, by the controller, that the statistical value of the global traffic does not exceed the preset threshold in at least two successive detection periods, and delivering, by the controller, a prevention cancellation instruction message to the second packet forwarding device, where the prevention cancellation instruction message is used to instruct the second packet forwarding device to stop executing the DDoS prevention policy.

With reference to the first aspect or either of the foregoing possible implementations of the first aspect, in a third possible implementation of the first aspect, before the controller delivers the DDoS prevention policy to the second packet forwarding device, the method further includes determining, by the controller according to the statistical data, a packet forwarding device closest to an attack source on an attack path, and setting the packet forwarding device closest to the attack source as the second packet forwarding device.

With reference to the third possible implementation of the first aspect, in a fourth possible implementation of the first aspect, the statistical information of the traffic flowing to the destination IP address includes a volume of the traffic flowing from the first packet forwarding device to the destination IP address, and determining, by the controller according to the statistical data, a packet forwarding device closest to an attack source on an attack path includes determining, by the controller, a first attack path according to the volume of the traffic flowing from the first packet forwarding device to the destination IP address, where the first attack path is an attack path, of at least one attack path, with a maximum volume of traffic flowing to the destination IP address, and determining, by the controller according to the first attack path, the packet forwarding device closest to the attack source, where the packet forwarding device closest to the attack source is located on an SDN edge that is on the first attack path and that is on a side of a source address of the traffic flowing to the destination IP address.

With reference to the first aspect or any one of the foregoing possible implementations of the first aspect, in a fifth possible implementation, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the second packet forwarding device to perform, by configuring a black-hole route, packet discarding processing on the traffic flowing to the destination IP address, the traffic limiting response policy is used to instruct the second packet forwarding device to perform traffic limiting processing on the traffic flowing to the destination IP address, the rate limiting response policy is used to instruct the second packet forwarding device to perform rate limiting processing on the traffic flowing to the destination IP address, the discarding response policy is used to instruct the second packet forwarding device to perform packet discarding processing on the traffic flowing to the destination IP address, the local cleaning response policy is used to instruct the second packet forwarding device to locally perform cleaning processing on the traffic flowing to the destination IP address, and the dynamic diversion and cleaning response policy is used to instruct the second packet forwarding device to send the traffic flowing to the destination IP address to a cleaning device for cleaning processing.

With reference to the fifth possible implementation of the first aspect, in a sixth possible implementation of the first aspect, the statistical data further includes a load value of the first packet forwarding device, and before the controller delivers the DDoS prevention policy to the second packet forwarding device, the method further includes determining, by the controller, a first diversion path according to the load value of the first packet forwarding device, where the first diversion path is a path with a minimum load between the second packet forwarding device and the cleaning device, and the first diversion path includes the second packet forwarding device and the cleaning device, and the DDoS prevention policy delivered by the controller to the second packet forwarding device is the dynamic diversion and cleaning response policy, the dynamic diversion and cleaning response policy includes indication information of the first diversion path, and the indication information of the first diversion path is used to instruct the second packet forwarding device to send, through the first diversion path, the traffic flowing to the destination IP address to the cleaning device for cleaning processing.

With reference to the fifth possible implementation of the first aspect, in a seventh possible implementation of the first aspect, before the controller delivers the DDoS prevention policy to the second packet forwarding device, the method further includes determining, by the controller, a second diversion path according to an SDN topological relationship, where the second diversion path is a shortest path between the second packet forwarding device and the cleaning device, and the SDN topological relationship includes a connection relationship between the packet forwarding devices in the SDN and a connection relationship between one or more packet forwarding devices and the cleaning device, and the DDoS prevention policy delivered by the controller to the second packet forwarding device is the dynamic diversion and cleaning response policy, the dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing.

A second aspect of the present disclosure provides an SDN-based DDoS attack prevention method, where the method is applied to an SDN system, the SDN system includes a controller and a packet forwarding device, the method is executed by the packet forwarding device, and the method includes receiving a traffic statistics collection instruction sent by the controller, where the traffic statistics collection instruction is used to instruct the packet forwarding device to perform traffic statistics collection, and the traffic statistics collection instruction carries a destination IP address, collecting, according to the traffic statistics collection instruction, statistical information of traffic flowing to the destination IP address, and reporting statistical data to the controller, where the statistical data includes the statistical information of the traffic flowing to the destination IP address.

With reference to the second aspect, in a first possible implementation of the second aspect, the traffic statistics collection instruction further carries a detection start time, where the detection start time is used to notify the packet forwarding device of a start time of the traffic statistics collection, the traffic statistics collection is continuously performed according to a detection period, and the statistical data is reported to the controller according to the detection period.

With reference to the second aspect or the first possible implementation of the second aspect, in a second possible implementation of the second aspect, after reporting statistical data to the controller, the method further includes receiving a DDoS prevention policy sent by the controller, and performing, according to the DDoS prevention policy, prevention processing on the traffic flowing to the destination IP address.

With reference to the second possible implementation of the second aspect, in a third possible implementation of the second aspect, after receiving a DDoS prevention policy sent by the controller, the method further includes receiving a prevention cancellation instruction message sent by the controller, where the prevention cancellation instruction message is used to instruct the packet forwarding device to stop executing the DDoS prevention policy, and stopping, according to the prevention cancellation instruction message, performing prevention processing on the traffic flowing to the destination IP address.

With reference to the second possible implementation of the second aspect or the third possible implementation of the second aspect, in a fourth possible implementation of the second aspect, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the packet forwarding device to perform, by configuring a black-hole route, packet discarding processing on the traffic flowing to the destination IP address, and performing, according to the DDoS prevention policy, prevention processing on the traffic flowing to the destination IP address includes performing, using the black-hole route according to the black-hole route response policy, packet discarding processing on the traffic flowing to the destination IP address. The traffic limiting response policy is used to instruct the packet forwarding device to perform traffic limiting processing on the traffic flowing to the destination IP address, and performing, according to the DDoS prevention policy, prevention processing on the traffic flowing to the destination IP address includes performing, according to the traffic limiting response policy, traffic limiting processing on the traffic flowing to the destination IP address, the rate limiting response policy is used to instruct the packet forwarding device to perform rate limiting processing on the traffic flowing to the destination IP address, and performing, according to the DDoS prevention policy, prevention processing on the traffic flowing to the destination IP address includes performing, according to the rate limiting response policy, rate limiting processing on the traffic flowing to the destination IP address, the discarding response policy is used to instruct the packet forwarding device to perform packet discarding processing on the traffic flowing to the destination IP address, and performing, according to the DDoS prevention policy, prevention processing on the traffic flowing to the destination IP address includes performing, according to the discarding response policy, packet discarding processing on the traffic flowing to the destination IP address, the local cleaning response policy is used to instruct the packet forwarding device to locally perform cleaning processing on the traffic flowing to the destination IP address, and performing, according to the DDoS prevention policy, prevention processing on the traffic flowing to the destination IP address includes locally performing, according to the local cleaning response policy, cleaning processing on the traffic flowing to the destination IP address, and the dynamic diversion and cleaning response policy is used to instruct the packet forwarding device to send the traffic flowing to the destination IP address to a cleaning device for cleaning processing, and performing, according to the DDoS prevention policy, prevention processing on the traffic flowing to the destination IP address includes sending, according to the dynamic diversion and cleaning response policy, the traffic flowing to the destination IP address to the cleaning device for cleaning processing.

With reference to the fourth possible implementation of the second aspect, in a fifth possible implementation of the second aspect, the statistical data further includes a load value of the first packet forwarding device, the dynamic diversion and cleaning response policy includes indication information of a first diversion path, the indication information of the first diversion path is used to instruct the packet forwarding device to send, through the first diversion path, the traffic flowing to the destination IP address to the cleaning device for cleaning processing, the first diversion path is a path with a minimum load between the packet forwarding device and the cleaning device, and the first diversion path includes the second packet forwarding device and the cleaning device, and sending, according to the dynamic diversion and cleaning response policy, the traffic flowing to the destination IP address to the cleaning device for cleaning processing includes sending, through the first diversion path according to the dynamic diversion and cleaning response policy, the traffic flowing to the destination IP address to the cleaning device for cleaning processing.

With reference to the fourth possible implementation of the second aspect, in a sixth possible implementation of the second aspect, the dynamic diversion and cleaning response policy includes indication information of a second diversion path, the indication information of the second diversion path is used to instruct the packet forwarding device to send, through the second diversion path, the traffic flowing to the destination IP address to the cleaning device for cleaning processing, and the second diversion path is a shortest path between the packet forwarding device and the cleaning device, and sending, according to the dynamic diversion and cleaning response policy, the traffic flowing to the destination IP address to the cleaning device for cleaning processing includes sending, through the second diversion path according to the dynamic diversion and cleaning response policy, the traffic flowing to the destination IP address to the cleaning device for cleaning processing.

A third aspect of the present disclosure provides a controller, including a sending module configured to deliver a traffic statistics collection instruction to a first packet forwarding device, where the traffic statistics collection instruction is used to instruct the first packet forwarding device to perform traffic statistics collection, and the traffic statistics collection instruction carries a destination IP address, a receiving module configured to collect statistical data reported by the first packet forwarding device according to the traffic statistics collection instruction sent by the sending module, where the statistical data includes statistical information of traffic flowing to the destination IP address, and a processing module configured to obtain, according to the statistical data received by the receiving module, a statistical value of global traffic flowing to the destination IP address, where the statistical value of the global traffic indicates a statistical value that is used to reflect traffic flowing to the destination IP address within a range of the SDN and that is obtained after the controller summarizes statistical data reported by at least two packet forwarding devices including the first packet forwarding device, and determine whether the statistical value of the global traffic exceeds a preset threshold, where the sending module is further configured to deliver a DDoS prevention policy to a second packet forwarding device based on a determining result, determined by the processing module, that the statistical value of the global traffic exceeds the preset threshold.

With reference to the third aspect, in a first possible implementation of the third aspect, the traffic statistics collection instruction further carries a detection start time, where the detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period, the processing module is further configured to determine that the statistical value of the global traffic does not exceed the preset threshold in at least two successive detection periods, and the sending module is further configured to deliver a prevention cancellation instruction message to the second packet forwarding device based on a result, determined by the processing module, that the statistical value of the global traffic does not exceed the preset threshold in the at least two successive detection periods, where the prevention cancellation instruction message is used to instruct the second packet forwarding device to stop executing the DDoS prevention policy.

With reference to the third aspect or the first possible implementation of the third aspect, in a second possible implementation of the third aspect, before the sending module delivers the DDoS prevention policy to the second packet forwarding device, the processing module is further configured to determine, according to the statistical data received by the receiving module, a packet forwarding device closest to an attack source on an attack path, and set the packet forwarding device closest to the attack source as the second packet forwarding device.

With reference to the second possible implementation of the third aspect, in a third possible implementation of the third aspect, the statistical information of the traffic flowing to the destination IP address includes a volume of the traffic flowing from the first packet forwarding device to the destination IP address, and the processing module is further configured to determine a first attack path according to the volume of the traffic that is received by the receiving module and that is flowing from the first packet forwarding device to the destination IP address, where the first attack path is an attack path, of at least one attack path, with a maximum volume of traffic flowing to the destination IP address, and determine, according to the first attack path, the packet forwarding device closest to the attack source, where the packet forwarding device closest to the attack source is located on an SDN edge that is on the first attack path and that is on a side of a source address of the traffic flowing to the destination IP address.

With reference to the third aspect or any one of the foregoing possible implementations of the third aspect, in a fourth possible implementation of the third aspect, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the second packet forwarding device to perform, by configuring a black-hole route, packet discarding processing on the traffic flowing to the destination IP address, the traffic limiting response policy is used to instruct the second packet forwarding device to perform traffic limiting processing on the traffic flowing to the destination IP address, the rate limiting response policy is used to instruct the second packet forwarding device to perform rate limiting processing on the traffic flowing to the destination IP address, the discarding response policy is used to instruct the second packet forwarding device to perform packet discarding processing on the traffic flowing to the destination IP address, the local cleaning response policy is used to instruct the second packet forwarding device to locally perform cleaning processing on the traffic flowing to the destination IP address, and the dynamic diversion and cleaning response policy is used to instruct the second packet forwarding device to send the traffic flowing to the destination IP address to a cleaning device for cleaning processing.

With reference to the fourth possible implementation of the third aspect, in a fifth possible implementation of the third aspect, the statistical data further includes a load value of the first packet forwarding device, before the sending module delivers the DDoS prevention policy to the second packet forwarding device, the processing module is further configured to determine a first diversion path according to the load value of the first packet forwarding device, where the first diversion path is a path with a minimum load between the second packet forwarding device and the cleaning device, and the first diversion path includes the second packet forwarding device and the cleaning device, and the DDoS prevention policy delivered by the sending module to the second packet forwarding device according to the first diversion path determined by the processing module is the dynamic diversion and cleaning response policy, the dynamic diversion and cleaning response policy includes indication information of the first diversion path, and the indication information of the first diversion path is used to instruct the second packet forwarding device to send, through the first diversion path, the traffic flowing to the destination IP address to the cleaning device for cleaning processing.

With reference to the fourth possible implementation of the third aspect, in a sixth possible implementation of the third aspect, before the sending module delivers the DDoS prevention policy to the second packet forwarding device, the processing module is further configured to determine a second diversion path according to an SDN topological relationship, where the second diversion path is a shortest path between the second packet forwarding device and the cleaning device, and the SDN topological relationship includes a connection relationship between the packet forwarding devices in the SDN and a connection relationship between one or more packet forwarding devices and the cleaning device, and the DDoS prevention policy delivered by the sending module to the second packet forwarding device according to the second diversion path determined by the processing module is the dynamic diversion and cleaning response policy, the dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing.

A fourth aspect of the present disclosure provides a packet forwarding device, where the packet forwarding device is applied to an SDN system, the SDN system includes a controller and the packet forwarding device, and the packet forwarding device includes a receiving module configured to receive a traffic statistics collection instruction sent by the controller, where the traffic statistics collection instruction is used to instruct a processing module to perform traffic statistics collection, and the traffic statistics collection instruction carries a destination IP address, the processing module configured to collect, according to the traffic statistics collection instruction received by the receiving module, statistical information of traffic flowing to the destination IP address, and a sending module configured to report statistical data to the controller according to the statistical information, collected by the processing module, of the traffic flowing to the destination IP address, where the statistical data includes the statistical information of the traffic flowing to the destination IP address.

With reference to the fourth aspect, in a first possible implementation of the fourth aspect, the traffic statistics collection instruction further carries a detection start time, where the detection start time is used to notify the processing module of a start time of the traffic statistics collection, the traffic statistics collection is continuously performed according to a detection period, and the statistical data is reported to the controller according to the detection period.

With reference to the fourth aspect or the first possible implementation of the fourth aspect, in a second possible implementation of the fourth aspect, after the sending module reports the statistical data to the controller, the receiving module is further configured to receive a DDoS prevention policy sent by the controller, and the processing module is further configured to perform, according to the DDoS prevention policy received by the receiving module, prevention processing on the traffic flowing to the destination IP address.

With reference to the second possible implementation of the fourth aspect, in a third possible implementation of the fourth aspect, after receiving the DDoS prevention policy sent by the controller, the receiving module is further configured to receive a prevention cancellation instruction message sent by the controller, where the prevention cancellation instruction message is used to instruct the processing module to stop executing the DDoS prevention policy, and the processing module is further configured to stop, according to the prevention cancellation instruction message received by the receiving module, performing prevention processing on the traffic flowing to the destination IP address.

With reference to the first possible implementation of the fourth aspect or the second possible implementation of the fourth aspect, in a fourth possible implementation of the fourth aspect, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the processing module to perform, by configuring a black-hole route, packet discarding processing on the traffic flowing to the destination IP address, and the processing module is further configured to perform, using the black-hole route according to the black-hole route response policy received by the receiving module, packet discarding processing on the traffic flowing to the destination IP address, the traffic limiting response policy is used to instruct the processing module to perform traffic limiting processing on the traffic flowing to the destination IP address, and the processing module is further configured to perform, according to the traffic limiting response policy received by the receiving module, traffic limiting processing on the traffic flowing to the destination IP address, the rate limiting response policy is used to instruct the processing module to perform rate limiting processing on the traffic flowing to the destination IP address, and the processing module is further configured to perform, according to the rate limiting response policy received by the receiving module, rate limiting processing on the traffic flowing to the destination IP address, the discarding response policy is used to instruct the processing module to perform packet discarding processing on the traffic flowing to the destination IP address, and the processing module is further configured to perform, according to the discarding response policy received by the receiving module, packet discarding processing on the traffic flowing to the destination IP address, the local cleaning response policy is used to instruct the processing module to locally perform cleaning processing on the traffic flowing to the destination IP address, and the processing module is further configured to locally perform, according to the local cleaning response policy received by the receiving module, cleaning processing on the traffic flowing to the destination IP address, and the dynamic diversion and cleaning response policy is used to instruct the processing module to send the traffic flowing to the destination IP address to a cleaning device for cleaning processing, and the processing module is further configured to instruct, according to the dynamic diversion and cleaning response policy received by the receiving module, the sending module to send the traffic flowing to the destination IP address to the cleaning device for cleaning processing.

With reference to the fourth possible implementation of the fourth aspect, in a fifth possible implementation of the fourth aspect, the statistical data further includes a load value of the first packet forwarding device, and the dynamic diversion and cleaning response policy includes indication information of the first diversion path, the indication information of the first diversion path is used to instruct to send, through a first diversion path, the traffic flowing to the destination IP address to the cleaning device for cleaning processing, the first diversion path is a path with a minimum load between the packet forwarding device and the cleaning device, and the first diversion path includes the second packet forwarding device and the cleaning device, and the processing module is further configured to instruct, according to the dynamic diversion and cleaning response policy received by the receiving module, the sending module to send, through the first diversion path, the traffic flowing to the destination IP address to the cleaning device for cleaning processing.

With reference to the fourth possible implementation of the fourth aspect, in a sixth possible implementation of the fourth aspect, the dynamic diversion and cleaning response policy includes indication information of the second diversion path, where the indication information of the second diversion path is used to instruct to send, through a second diversion path, the traffic flowing to the destination IP address to the cleaning device for cleaning processing, and the second diversion path is a shortest path between the packet forwarding device and the cleaning device, and the processing module is further configured to instruct, according to the dynamic diversion and cleaning response policy received by the receiving module, the sending module to send, through the second diversion path, the traffic flowing to the destination IP address to the cleaning device for cleaning processing.

A fifth aspect of the present disclosure provides an SDN system, including a controller, a first packet forwarding device, and a second packet forwarding device, where the controller is configured to deliver a traffic statistics collection instruction to the first packet forwarding device, where the traffic statistics collection instruction is used to instruct the first packet forwarding device to perform traffic statistics collection, and the traffic statistics collection instruction carries a destination IP address, collect statistical data reported by the first packet forwarding device according to the traffic statistics collection instruction, where the statistical data includes statistical information of traffic flowing to the destination IP address, obtain, according to the statistical data, a statistical value of global traffic flowing to the destination IP address, where the statistical value of the global traffic indicates a statistical value that is used to reflect traffic flowing to the destination IP address within a range of the SDN and that is obtained after the controller summarizes statistical data reported by at least two packet forwarding devices including the first packet forwarding device, and determine whether the statistical value of the global traffic exceeds a preset threshold, and deliver a DDoS prevention policy to the second packet forwarding device based on a determining result that the statistical value of the global traffic exceeds the preset threshold. The first packet forwarding device is configured to receive the traffic statistics collection instruction sent by the controller, collect, according to the traffic statistics collection instruction, the statistical information of the traffic flowing to the destination IP address, and report the statistical data to the controller, and the second packet forwarding device is configured to receive the DDoS prevention policy sent by the controller, and perform, according to the DDoS prevention policy, prevention processing on the traffic flowing to the destination IP address.

With reference to the fifth aspect, in a first possible implementation of the fifth aspect, the traffic statistics collection instruction further carries a detection start time, where the detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period.

With reference to the first possible implementation of the fifth aspect, in a second possible implementation of the fifth aspect, the controller is further configured to determine that the statistical value of the global traffic does not exceed the preset threshold in at least two successive detection periods, and deliver a prevention cancellation instruction message to the second packet forwarding device, where the prevention cancellation instruction message is used to instruct the second packet forwarding device to stop executing the DDoS prevention policy, and the second packet forwarding device is further configured to receive the prevention cancellation instruction message, and stop executing the DDoS prevention policy.

With reference to the fifth aspect or either of the foregoing possible implementations of the fifth aspect, in a third possible implementation of the fifth aspect, before delivering the DDoS prevention policy to the second packet forwarding device, the controller is further configured to determine, according to the statistical data, a packet forwarding device closest to an attack source on an attack path, and use the packet forwarding device closest to the attack source as the second packet forwarding device.

With reference to the third possible implementation of the fifth aspect, in a fourth possible implementation of the fifth aspect, the statistical information of the traffic flowing to the destination IP address includes a volume of the traffic flowing from the first packet forwarding device to the destination IP address, and the controller is further configured to determine a first attack path according to the volume of the traffic flowing from the first packet forwarding device to the destination IP address, where the first attack path is an attack path, of at least one attack path, with a maximum volume of traffic flowing to the destination IP address, and determine, according to the first attack path, the packet forwarding device closest to the attack source, where the packet forwarding device closest to the attack source is located on an SDN edge that is on the first attack path and that is on a side of a source address of the traffic flowing to the destination IP address.

With reference to the fifth aspect or any one of the foregoing possible implementations of the fifth aspect, in a fifth possible implementation of the fifth aspect, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the second packet forwarding device to perform, by configuring a black-hole route, packet discarding processing on the traffic flowing to the destination IP address, and the second packet forwarding device is further configured to perform, using the black-hole route according to the black-hole route response policy, packet discarding processing on the traffic flowing to the destination IP address, the traffic limiting response policy is used to instruct the second packet forwarding device to perform traffic limiting processing on the traffic flowing to the destination IP address, and the second packet forwarding device is further configured to perform, according to the traffic limiting response policy, traffic limiting processing on the traffic flowing to the destination IP address, the rate limiting response policy is used to instruct the second packet forwarding device to perform rate limiting processing on the traffic flowing to the destination IP address, and the second packet forwarding device is further configured to perform, according to the rate limiting response policy, rate limiting processing on the traffic flowing to the destination IP address, the discarding response policy is used to instruct the second packet forwarding device to perform packet discarding processing on the traffic flowing to the destination IP address, and the second packet forwarding device is further configured to perform, according to the discarding response policy, packet discarding processing on the traffic flowing to the destination IP address, the local cleaning response policy is used to instruct the second packet forwarding device to locally perform cleaning processing on the traffic flowing to the destination IP address, and the second packet forwarding device is further configured to perform, according to the local cleaning response policy, cleaning processing on the traffic flowing to the destination IP address, and the dynamic diversion and cleaning response policy is used to instruct the second packet forwarding device to send the traffic flowing to the destination IP address to a cleaning device for cleaning processing, and the second packet forwarding device is further configured to send, according to the dynamic diversion and cleaning response policy, the traffic flowing to the destination IP address to the cleaning device for cleaning processing.

With reference to the fifth possible implementation of the fifth aspect, in a sixth possible implementation of the fifth aspect, the statistical data further includes a load value of the first packet forwarding device, and before delivering the DDoS prevention policy to the second packet forwarding device, the controller is further configured to determine a first diversion path according to the load value of the first packet forwarding device, where the first diversion path is a path with a minimum load between the second packet forwarding device and the cleaning device, and the first diversion path includes the second packet forwarding device and the cleaning device, the DDoS prevention policy delivered to the second packet forwarding device is the dynamic diversion and cleaning response policy, the dynamic diversion and cleaning response policy includes indication information of the first diversion path, and the indication information of the first diversion path is used to instruct the second packet forwarding device to send, through the first diversion path, the traffic flowing to the destination IP address to the cleaning device for cleaning processing, and the second packet forwarding device is further configured to send, through the first diversion path, the traffic flowing to the destination IP address to the cleaning device for cleaning processing.

With reference to the fifth possible implementation of the fifth aspect, in a seventh possible implementation of the fifth aspect, before delivering the DDoS prevention policy to the second packet forwarding device, the controller is further configured to determine a second diversion path according to an SDN topological relationship, where the second diversion path is a shortest path between the second packet forwarding device and the cleaning device, and the SDN topological relationship includes a connection relationship between the packet forwarding devices in the SDN and a connection relationship between one or more packet forwarding devices and the cleaning device, the DDoS prevention policy delivered to the second packet forwarding device is the dynamic diversion and cleaning response policy, the dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing, and the second packet forwarding device is further configured to send, through the second diversion path, the traffic flowing to the destination IP address to the cleaning device for cleaning processing.

A sixth aspect of the present disclosure provides a controller, including a processor, a memory, a transceiver, and a bus, where the transceiver includes a southbound interface unit. The southbound interface unit is configured to deliver a traffic statistics collection instruction to a first packet forwarding device, where the traffic statistics collection instruction is used to instruct the first packet forwarding device to perform traffic statistics collection, and the traffic statistics collection instruction carries a destination IP address, and collect statistical data reported by the first packet forwarding device according to the traffic statistics collection instruction, where the statistical data includes statistical information of traffic flowing to the destination IP address. The processor is configured to obtain, according to the statistical data received by the receiving module, a statistical value of global traffic flowing to the destination IP address, where the statistical value of the global traffic indicates a statistical value that is used to reflect traffic flowing to the destination IP address within a range of the SDN and that is obtained after the controller summarizes statistical data reported by at least two packet forwarding devices including the first packet forwarding device, and determine whether the statistical value of the global traffic exceeds a preset threshold. The southbound interface unit is further configured to deliver a DDoS prevention policy to a second packet forwarding device based on a determining result, determined by the processor, that the statistical value of the global traffic exceeds the preset threshold, and the memory is configured to store the statistical data and the DDoS prevention policy.

With reference to the sixth aspect, in a first possible implementation of the sixth aspect, the traffic statistics collection instruction further carries a detection start time, where the detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period, the processor is further configured to determine that the statistical value of the global traffic does not exceed the preset threshold in at least two detection periods, and the southbound interface unit is further configured to deliver a prevention cancellation instruction message to the second packet forwarding device based on a result, determined by the processor, that the statistical value of the global traffic does not exceed the preset threshold in the at least two successive detection periods, where the prevention cancellation instruction message is used to instruct the packet forwarding device to stop executing the DDoS prevention policy.

With reference to the sixth aspect or the first possible implementation of the sixth aspect, in a second possible implementation of the sixth aspect, before the southbound interface unit delivers the DDoS prevention policy to the second packet forwarding device, the processor is further configured to determine, according to the statistical data received by the southbound interface unit, a packet forwarding device closest to an attack source on an attack path, and set the packet forwarding device closest to the attack source as the second packet forwarding device, and the southbound interface unit is further configured to deliver the DDoS prevention policy to the second packet forwarding device.

With reference to the second possible implementation of the sixth aspect, in a third possible implementation of the sixth aspect, the statistical information of the traffic flowing to the destination IP address includes a volume of the traffic flowing from the first packet forwarding device to the destination IP address, and the processor is further configured to determine a first attack path according to the volume, received by the southbound interface unit, of the traffic flowing from the first packet forwarding device to the destination IP address, where the first attack path is an attack path, of at least one attack path, with a maximum volume of traffic flowing to the destination IP address, and determine, according to the first attack path, the packet forwarding device closest to the attack source, where the packet forwarding device closest to the attack source is located on an SDN edge that is on the first attack path and that is on a side of a source address of the traffic flowing to the destination IP address.

With reference to the sixth aspect or any one of the foregoing possible implementations of the sixth aspect, in a fourth possible implementation of the sixth aspect, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the second packet forwarding device to perform, by configuring a black-hole route, packet discarding processing on the traffic flowing to the destination IP address. the traffic limiting response policy is used to instruct the second packet forwarding device to perform traffic limiting processing on the traffic flowing to the destination IP address, the rate limiting response policy is used to instruct the second packet forwarding device to perform rate limiting processing on the traffic flowing to the destination IP address, the discarding response policy is used to instruct the second packet forwarding device to perform packet discarding processing on the traffic flowing to the destination IP address, the local cleaning response policy is used to instruct the second packet forwarding device to locally perform cleaning processing on the traffic flowing to the destination IP address, and the dynamic diversion and cleaning response policy is used to instruct the second packet forwarding device to send the traffic flowing to the destination IP address to a cleaning device for cleaning processing.

With reference to the fourth possible implementation of the sixth aspect, in a fifth possible implementation of the sixth aspect, the statistical data further includes a load value of the first packet forwarding device, and before the southbound interface delivers the DDoS prevention policy to the second packet forwarding device, the processor is further configured to determine a first diversion path according to the load value of the first packet forwarding device, where the first diversion path is a path with a minimum load between the second packet forwarding device and the cleaning device, and the first diversion path includes the second packet forwarding device and the cleaning device, and the DDoS prevention policy delivered by the southbound interface unit to the second packet forwarding device according to the first diversion path determined by the processor is the dynamic diversion and cleaning response policy, the dynamic diversion and cleaning response policy includes indication information of the first diversion path, and the indication information of the first diversion path is used to instruct the second packet forwarding device to send, through the first diversion path, the traffic flowing to the destination IP address to the cleaning device for cleaning processing.

With reference to the fourth possible implementation of the sixth aspect, in a sixth possible implementation of the sixth aspect, before the southbound interface unit delivers the DDoS prevention policy to the second packet forwarding device, the processor is further configured to determine a second diversion path according to an SDN topological relationship, where the second diversion path is a shortest path between the second packet forwarding device and the cleaning device, and the SDN topological relationship includes a connection relationship between the packet forwarding devices in the SDN and a connection relationship between one or more packet forwarding devices and the cleaning device, and the DDoS prevention policy delivered by the southbound interface unit to the second packet forwarding device according to the second diversion path determined by the processor is the dynamic diversion and cleaning response policy, the dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing.

A seventh aspect of the present disclosure provides a packet forwarding device, where the packet forwarding device is applied to an SDN system, the SDN system includes a controller and the packet forwarding device, and the packet forwarding device includes a processor, a memory, a transceiver, and a bus, where the transceiver includes a northbound interface unit. The northbound interface unit is configured to receive a traffic statistics collection instruction sent by the controller, where the traffic statistics collection instruction is used to instruct the processor to perform traffic statistics collection, and the traffic statistics collection instruction carries a destination IP address. The processor is configured to collect, according to the traffic statistics collection instruction received by the northbound interface unit, statistical information of traffic flowing to the destination IP address. The northbound interface unit is further configured to report statistical data to the controller according to the statistical information, collected by the processor, of the traffic flowing to the destination IP address, where the statistical data includes the statistical information of the traffic flowing to the destination IP address, and the memory is configured to store the traffic statistics collection instruction and the statistical information of the traffic flowing to the destination IP address.

With reference to the seventh aspect, in a first possible implementation of the seventh aspect, the traffic statistics collection instruction further carries a detection start time, where the detection start time is used to notify the processor of a start time of the traffic statistics collection, the traffic statistics collection is continuously performed according to a detection period, and the statistical data is reported to the controller according to the detection period.

With reference to the seventh aspect or the first possible implementation of the seventh aspect, in a second possible implementation, after reporting the statistical data to the controller, the northbound interface unit is further configured to receive a DDoS prevention policy sent by the controller, and the processor is further configured to perform, according to the DDoS prevention policy received by the northbound interface unit, prevention processing on the traffic flowing to the destination IP address.

With reference to the second possible implementation of the seventh aspect, in a third possible implementation of the seventh aspect, after receiving the DDoS prevention policy sent by the controller, the northbound interface unit is further configured to receive a prevention cancellation instruction message sent by the controller, where the prevention cancellation instruction message is used to instruct the processor to stop executing the DDoS prevention policy, and the processor is further configured to stop, according to the prevention cancellation instruction message received by the northbound interface unit, performing prevention processing on the traffic flowing to the destination IP address.

With reference to the first possible implementation of the seventh aspect or the second possible implementation of the seventh aspect, in a fourth possible implementation of the seventh aspect, the DDoS prevention policy includes any one of a black-hole route response policy, a traffic limiting response policy, a rate limiting response policy, a discarding response policy, a local cleaning response policy, or a dynamic diversion and cleaning response policy, where the black-hole route response policy is used to instruct the processor to perform, by configuring a black-hole route, packet discarding processing on the traffic flowing to the destination IP address, and the processor is further configured to perform, using the black-hole route according to the black-hole route response policy received by the northbound interface unit, packet discarding processing on the traffic flowing to the destination IP address, the traffic limiting response policy is used to instruct the processor to perform traffic limiting processing on the traffic flowing to the destination IP address, and the processor is further configured to perform, according to the traffic limiting response policy received by the northbound interface unit, traffic limiting processing on the traffic flowing to the destination IP address, the rate limiting response policy is used to instruct the processor to perform rate limiting processing on the traffic flowing to the destination IP address, and the processor is further configured to perform, according to the rate limiting response policy received by the northbound interface unit, rate limiting processing on the traffic flowing to the destination IP address, the discarding response policy is used to instruct the processor to perform packet discarding processing on the traffic flowing to the destination IP address, and the processor is further configured to perform, according to the discarding response policy received by the northbound interface unit, packet discarding processing on the traffic flowing to the destination IP address, the local cleaning response policy is used to instruct the processor to locally perform cleaning processing on the traffic flowing to the destination IP address, and the processor is further configured to locally perform, according to the local cleaning response policy received by the northbound interface unit, cleaning processing on the traffic flowing to the destination IP address, and the dynamic diversion and cleaning response policy is used to instruct the processor to send the traffic flowing to the destination IP address to a cleaning device for cleaning processing, and the processor is further configured to instruct, according to the dynamic diversion and cleaning response policy received by the northbound interface unit, the northbound interface unit to send the traffic flowing to the destination IP address to the cleaning device for cleaning processing.

With reference to the fourth possible implementation of the seventh aspect, in a fifth possible implementation of the seventh aspect, the statistical data further includes a load value of the first packet forwarding device, the dynamic diversion and cleaning response policy includes indication information of the first diversion path, the indication information of the first diversion path is used to instruct to send, through a first diversion path, the traffic flowing to the destination IP address to the cleaning device for cleaning processing, the first diversion path is a path with a minimum load between the packet forwarding device and the cleaning device, and the first diversion path includes the second packet forwarding device and the cleaning device, and the processor is further configured to instruct, according to the dynamic diversion and cleaning response policy received by the northbound interface unit, the northbound interface unit to send, through the first diversion path, the traffic flowing to the destination IP address to the cleaning device for cleaning processing.

With reference to the fourth possible implementation of the seventh aspect, in a sixth possible implementation of the seventh aspect, the dynamic diversion and cleaning response policy includes indication information of the second diversion path, where the indication information of the second diversion path is used to instruct to send, through a second diversion path, the traffic flowing to the destination IP address to the cleaning device for cleaning processing, and the second diversion path is a shortest path between the packet forwarding device and the cleaning device, and the processor is further configured to instruct, according to the dynamic diversion and cleaning response policy received by the northbound interface unit, the northbound interface unit to send, through the second diversion path, the traffic flowing to the destination IP address to the cleaning device for cleaning processing.

According to the SDN-based DDoS attack prevention method, the apparatus, and the system that are provided in embodiments of the present disclosure. A controller delivers a traffic statistics collection instruction to a first packet forwarding device. The traffic statistics collection instruction is used to instruct the first packet forwarding device to perform traffic statistics collection, and the traffic statistics collection instruction carries a destination IP address. The controller collects statistical data reported by the first packet forwarding device according to the traffic statistics collection instruction. The statistical data includes statistical information of traffic flowing to the destination IP address. The controller obtains, according to the statistical data, a statistical value of global traffic flowing to the destination IP address, determines whether the statistical value of the global traffic exceeds a preset threshold, and delivers a DDoS prevention policy to a second packet forwarding device based on a determining result that the statistical value of the global traffic exceeds the preset threshold. Correspondingly, the first packet forwarding device receives the traffic statistics collection instruction sent by the controller, collects the statistical information of the traffic flowing to the destination IP address according to the traffic statistics collection instruction, and finally reports the statistical data to the controller. Correspondingly, the second packet forwarding device receives the DDoS prevention policy sent by the controller, and performs, according to the DDoS prevention policy, prevention processing on the traffic flowing to the destination IP address. This reduces impact of a DDoS attack on a network and improves network security.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

The present disclosure provides a technical solution of SDN-based DDoS attack prevention. A controller in an SDN instructs a packet forwarding device to perform traffic statistics collection based on a destination IP address, and the controller collects statistical data of the packet forwarding device, and determines whether a network attack occurs. If an attack occurs, this solution provides multiple possible DDoS prevention manners. For example, the SDN supports centralized management on network topologies and statuses, and the controller has a capability of sensing a global topology. Therefore, the controller can know which packet forwarding devices are used to connect to another network, that is, know which packet forwarding devices are located on an SDN edge in order to instruct a packet forwarding device that is close to an attack source and that is located on the SDN edge to perform traffic limiting, or discarding, or blocking on attack traffic. Alternatively, the controller instructs to divert suspected attack traffic to a dedicated cleaning device for cleaning the suspected attack traffic, thereby reducing impact of the attack traffic on the network.

Figure 1:
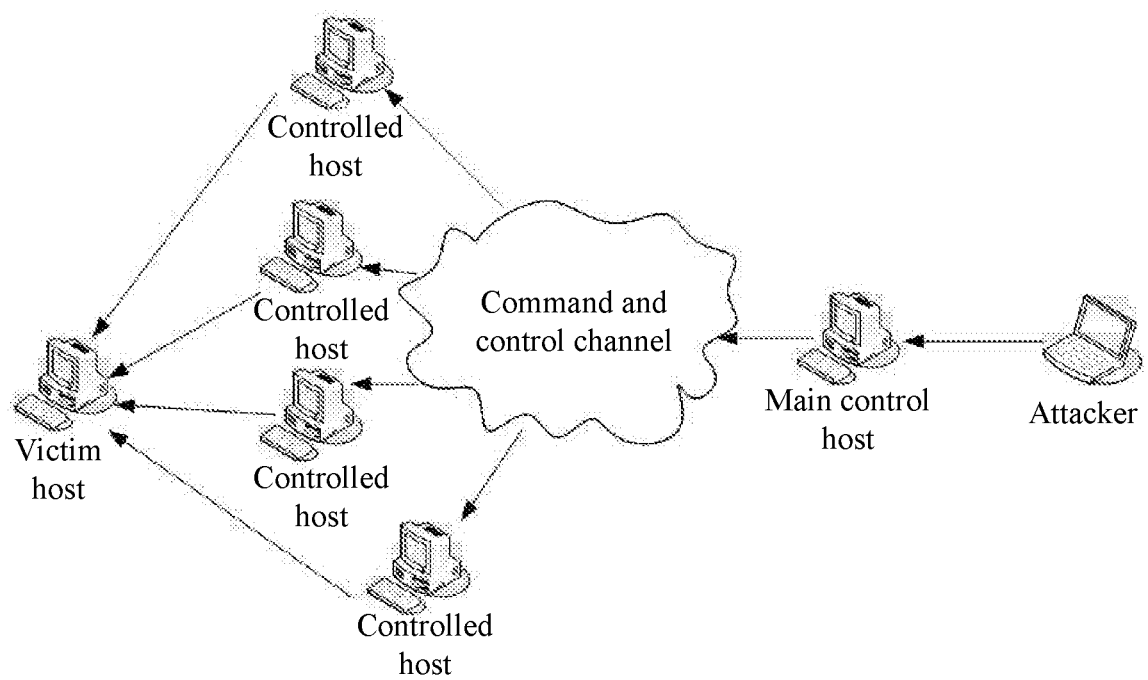
FIG. 1 is a schematic diagram of a DDoS attack.
Figure 2:
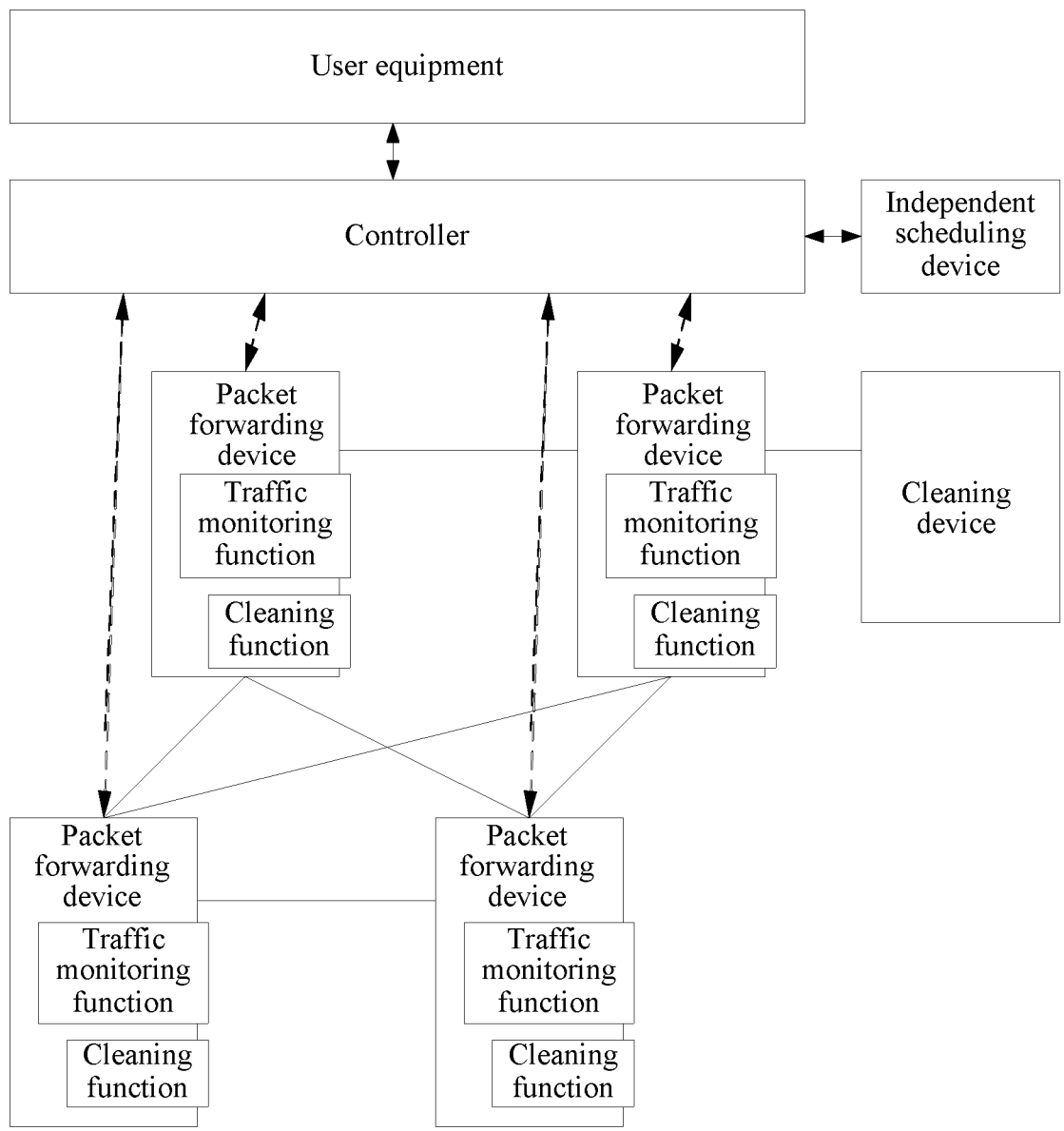
FIG. 2 is a schematic deployment diagram of an SDN-based DDoS attack prevention system according to an embodiment of the present disclosure.

FIG. 2 is a schematic deployment diagram of an SDN-based DDoS attack prevention system according to an embodiment of the present disclosure. Referring to FIG. 2, the system includes at least one packet forwarding device, a controller, and a cleaning device.

The controller communicates with the packet forwarding devices and the cleaning device using a southbound interface. The southbound interface may use the OPENFLOW protocol, the Forwarding and Control Element Separation (ForCES) protocol, the Path Computation Element-Communication Protocol (PCE-P) protocol, or the like.

Optionally, when there is only one controller in the SDN, the controller may have a controller scheduling function. The controller scheduling function is used to perform management, control, and scheduling traffic on packet forwarding devices in the entire SDN, and includes functions such as link discovery, topology management, policy formulation, and entry delivery.

Alternatively, for a cluster including multiple controllers in the SDN, the controller scheduling function may be independently set on an independent scheduling device. For example, one controller is selected from the multiple controllers as a primary controller. The primary controller may be used as the independent scheduling device. The primary controller communicates with the other controllers using an east-west interface. The primary controller is mainly responsible for generating and maintaining status information of secondary controllers, the packet forwarding device, and the cleaning device in the entire network. Once the primary controller fails, one controller is selected from the secondary controllers in the cluster as a new primary controller. In addition, the controller cluster is transparent to the packet forwarding devices and the cleaning device. That is, in a running process of the SDN, the packet forwarding device and the cleaning device do not need to care that a command received by the packet forwarding device or the cleaning device is from which controller. In addition, when the packet forwarding devices or the cleaning device sends a data packet to a controller, a previous operation manner involving a single controller may still be used, thereby ensuring logic centralization of the controllers. Currently, there is no clear standard for defining an east-west interface that is used for communication and connection between multiple controllers and a scheduling device. Generally, an existing mature cluster technology, for example, a server cluster technology, may be used to implement communication over the east-west interface.

Further, a DDoS control program may be installed on the controller, and the controller executes the DDoS control program to implement a configuration related to the DDoS prevention solution. Optionally, the DDoS control program may be installed on another user equipment. A user calls the DDoS control program using an application on the user equipment, and the user equipment executes the DDoS control program and interacts with the controller in order to implement the configuration related to the DDoS prevention solution. The controller communicates with the user equipment using a northbound interface of the controller. It should be noted that based on different requirements, there may be multiple solutions for protocol formulation of the northbound interface. For example, a representational state transfer (REST) application programming interface (API) is a common northbound interface form. Some conventional network equipment manufacturers provide a programming interface on their existing equipment, for direct calling by a service application, and the programming interface may also be considered as a northbound interface. A purpose is to improve configuration management flexibility without changing an existing device architecture, and respond to competition with an open protocol.

Each one of the packet forwarding devices may be a forwarder, or may be a switch, a router, a firewall, or the like in a conventional network. Each one of the packet forwarding devices has a traffic monitoring function and a cleaning function.

The traffic monitoring function of the packet forwarding device is used to monitor, based on a traffic statistics collection instruction delivered by the controller, traffic that passes through the packet forwarding device. The traffic statistics collection instruction carries a destination IP address, and the destination IP address may be an IP address or an IP address segment of a server that needs to be protected. The packet forwarding device may detect, according to the traffic monitoring function, statistical information of traffic flowing to the destination IP address, and report statistical data to the controller.

When the controller delivers an attack prevention policy, for example, a DDoS prevention policy, the cleaning function of the packet forwarding device is used to perform cleaning processing on suspected attack traffic based on the attack prevention policy to remove the suspected attack traffic.

In addition, the packet forwarding device may perform traffic limiting, discarding, or blocking on the traffic based on different attack prevention policies, or divert the suspected attack traffic to the cleaning device.

It should be noted that in the solution provided in this embodiment of the present disclosure, based on different functions of different steps in a network attack prevention process, the packet forwarding device may be classified into two types a first packet forwarding device and a second packet forwarding device.

The first packet forwarding device has the traffic monitoring function, and all packet forwarding devices in an SDN system may be used as the first packet forwarding device. The second packet forwarding device has the cleaning function. For example, to effectively perform prevention processing on the suspected attack traffic, the controller instructs a packet forwarding device that is close to an attack source and that is located on an SDN edge to perform prevention processing on the attack traffic. In this scenario, the packet forwarding device that is close to the attack source and that is located on the SDN edge is the second packet forwarding device. Generally, the second packet forwarding device may also have the traffic monitoring function. That is, the first packet forwarding device and the second packet forwarding device may be a same entity device or may be different entity devices.

The cleaning device is configured to receive the suspected attack traffic diverted by the packet forwarding device, clean the suspected attack traffic, and inject traffic obtained after the cleaning to the SDN.

It should be noted that, compared with an existing diversion solution, a diversion solution provided in this embodiment of the present disclosure has the following advantage. The controller in the SDN has link discovery and topology management functions, and therefore when the diversion solution is used, the controller may configure, according to an SDN topological relationship or the statistical data, that the second packet forwarding device diverts the suspected attack traffic to the cleaning device using a path with minimum impact on the SDN network. For example, a path closest to the cleaning device is selected for diversion, or a path with a minimum load is selected for diversion. Therefore, attack impact increased due to diversion in the other approaches is reduced. That is, the diversion solution provided in the present disclosure may be dynamically adjusted at any time according to a link status of the SDN. Accordingly, a policy corresponding to this solution is named as a dynamic diversion and cleaning response policy hereinafter.

Figure 3:
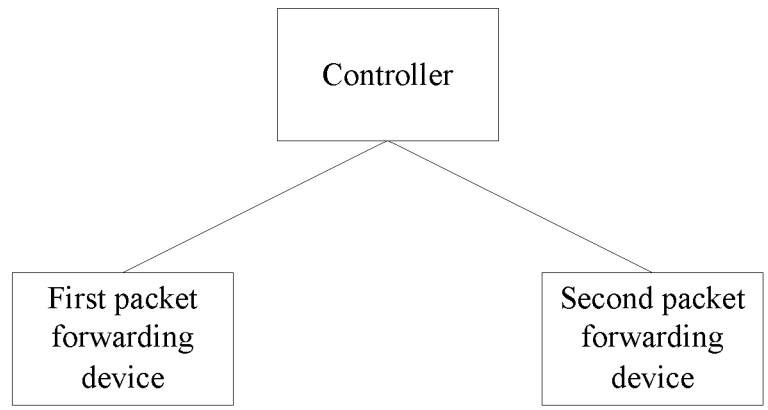
FIG. 3 is a schematic deployment diagram of an SDN system according to an embodiment of the present disclosure.

Further, FIG. 3 is a schematic deployment diagram of an SDN system according to an embodiment of the present disclosure. Referring to FIG. 3, the SDN system includes a controller, a first packet forwarding device, and a second packet forwarding device.

The controller is configured to deliver a traffic statistics collection instruction to the first packet forwarding device, where the traffic statistics collection instruction is used to instruct the first packet forwarding device to perform traffic statistics collection, and the traffic statistics collection instruction carries a destination IP address, collect statistical data reported by the first packet forwarding device according to the traffic statistics collection instruction, where the statistical data includes statistical information of traffic flowing to the destination IP address, obtain, according to the statistical data, a statistical value of global traffic flowing to the destination IP address, where the statistical value of the global traffic indicates a statistical value that is used to reflect traffic flowing to the destination IP address within a range of the SDN and that is obtained after the controller summarizes statistical data reported by at least two packet forwarding devices including the first packet forwarding device, and determine whether the statistical value of the global traffic exceeds a preset threshold, and deliver a DDoS prevention policy to the second packet forwarding device based on a determining result that the statistical value of the global traffic exceeds the preset threshold.

The first packet forwarding device is configured to receive the traffic statistics collection instruction sent by the controller, collect, according to the traffic statistics collection instruction, the statistical information of the traffic flowing to the destination IP address, and report the statistical data to the controller.

The second packet forwarding device is configured to receive the DDoS prevention policy sent by the controller, and perform, according to the DDoS prevention policy, prevention processing on the traffic flowing to the destination IP address.

According to the SDN system provided in this embodiment of the present disclosure, the controller delivers a traffic statistics collection instruction to the first packet forwarding device. The traffic statistics collection instruction is used to instruct the first packet forwarding device to perform traffic statistics collection, and the traffic statistics collection instruction carries a destination IP address. The controller collects statistical data reported by the first packet forwarding device according to the traffic statistics collection instruction. The statistical data includes statistical information of traffic flowing to the destination IP address. The controller obtains, according to the statistical data, a statistical value of global traffic flowing to the destination IP address, determines whether the statistical value of the global traffic exceeds a preset threshold, and delivers a DDoS prevention policy to a second packet forwarding device based on a determining result that the statistical value of the global traffic exceeds the preset threshold. Correspondingly, the first packet forwarding device receives the traffic statistics collection instruction sent by the controller, collects the statistical information of the traffic flowing to the destination IP address according to the traffic statistics collection instruction, and finally reports the statistical data to the controller. Correspondingly, the second packet forwarding device receives the DDoS prevention policy sent by the controller, and performs, according to the DDoS prevention policy, prevention processing on the traffic flowing to the destination IP address. This reduces impact of a DDoS attack on a network and improves network security.

Optionally, the traffic statistics collection instruction further carries a detection start time.

The detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period.

Further, the controller needs a mechanism to determine whether a network attack stops. A possible implementation includes determining that the statistical value of the global traffic does not exceed the preset threshold in at least two successive detection periods, and delivering a prevention cancellation instruction message to the second packet forwarding device, where the prevention cancellation instruction message is used to instruct the second packet forwarding device to stop executing the DDoS prevention policy.

The second packet forwarding device is further configured to receive the prevention cancellation instruction message, and stop executing the DDoS prevention policy.

Optionally, the controller may further deliver the DDoS prevention policy to a packet forwarding device that is close to an attack source and that is located on an SDN edge. A possible implementation is as follows.

Before delivering the DDoS prevention policy to the second packet forwarding device, the controller is further configured to determine, according to the statistical data, a packet forwarding device closest to an attack source on an attack path, and use the packet forwarding device closest to the attack source as the second packet forwarding device.

Further, the statistical information of the traffic flowing to the destination IP address includes a volume of the traffic flowing from the first packet forwarding device to the destination IP address. The controller is further configured to determine a first attack path according to the volume of the traffic flowing from the first packet forwarding device to the destination IP address, where the first attack path is an attack path, of at least one attack path, with a maximum volume of traffic flowing to the destination IP address, and determine, according to the first attack path, the packet forwarding device closest to the attack source, where the packet forwarding device closest to the attack source is located on an SDN edge that is on the first attack path and that is on a side of a source address of the traffic flowing to the destination IP address.

Optionally, the DDoS prevention policy includes any one of a black-hole route response policy, a traffic limiting response policy, a rate limiting response policy, a discarding response policy, a local cleaning response policy, or a dynamic diversion and cleaning response policy.

Further, the foregoing response policies are described as follows. A black-hole route refers to a route entry, pointing to no next hop, in an access control list (ACL) of a packet forwarding device. Similar to a common route entry, the black-hole route also includes a match item and an action. A packet that matches the match item of the black-hole route is to be discarded by the packet forwarding device and is forwarded to no next hop. The action in the black-hole route may be implemented in multiple manners. For example, a routing device forwards a packet to an invalid IP address, for example, 0.0.0.0, or to a loopback address, or using a null0 interface. The null2 is a logical interface on the routing device, and the null2 interface is always in an "up" state, but does not forward any packet. A packet forwarding device forwards a packet to a null0 interface on the packet forwarding device, and after receiving the packet, the null0 interface discards the packet. Based on the foregoing characteristics of the black-hole route, when a network attack occurs, the controller may configure a corresponding black-hole route response policy, and deliver the black-hole route response policy to the packet forwarding device in order to implement DDoS attack prevention. The black-hole route response policy is used to instruct the second packet forwarding device to perform, by configuring a black-hole route, packet discarding processing on the traffic flowing to the destination IP address. Further, the black-hole route response policy may include information such as the destination IP address and a protocol type supported by a packet.

The second packet forwarding device is further configured to perform, using the black-hole route according to the black-hole route response policy, packet discarding processing on the traffic flowing to the destination IP address.

Setting the black-hole route in the second packet forwarding device may implement packet discarding without giving a reason for discarding, thereby simplifying attack traffic processing and improving processing efficiency.

The traffic limiting response policy is used to instruct the second packet forwarding device to perform traffic limiting processing on the traffic flowing to the destination IP address. Further, the second packet forwarding device limits, based on the traffic limiting response policy, packet transmit/receive bandwidth in unit time, for example, specifying a maximum quantity of bytes of packets sent each second. The traffic limiting response policy may include the destination IP address, a protocol type supported by a packet, quintuple information of the packet, and the like. The packet forwarding device may perform the foregoing limiting based on the quintuple information of the packet. For example, the foregoing limiting is performed for a Transmission Control Protocol (TCP) packet and/or a UDP packet, the foregoing limiting is performed for a source port of a specific packet, the foregoing limiting is performed for a destination port of a specific packet, and a packet transmission rate is limited by setting a specific upper rate limit.

The second packet forwarding device is further configured to perform, according to the traffic limiting response policy, traffic limiting processing on the traffic flowing to the destination IP address.

The rate limiting response policy is used to instruct the second packet forwarding device to perform rate limiting processing on the traffic flowing to the destination IP address. For example, the second packet forwarding device sets transmit/receive bandwidth based on the rate limiting response policy.

The second packet forwarding device is further configured to perform, according to the rate limiting response policy, rate limiting processing on the traffic flowing to the destination IP address.

The discarding response policy is used to instruct the second packet forwarding device to perform packet discarding processing on the traffic flowing to the destination IP address. Further, the second packet forwarding device discards, based on the discarding response policy, a received packet that includes suspected network attack traffic or a to-be-sent packet that includes suspected network attack traffic. The discarding response policy may include the destination IP address, a protocol type supported by a packet, quintuple information of the packet, and the like. The quintuple information of the packet may include TCP information of the packet or UDP information of the packet, source port information of the packet, destination port information of the packet, drop packet information, and the like.

The second packet forwarding device is further configured to perform, according to the discarding response policy, packet discarding processing on the traffic flowing to the destination IP address.

The local cleaning response policy is used to instruct the second packet forwarding device to locally perform cleaning processing on the traffic flowing to the destination IP address. Further, the local cleaning response policy is used to instruct the second packet forwarding device to locally perform cleaning processing on the traffic flowing to the destination IP address. The second packet forwarding device locally performs, based on the local cleaning response policy, cleaning processing on a received packet that includes suspected network attack traffic or a to-be-sent packet that includes suspected network attack traffic. Optionally, the local cleaning response policy may include the destination IP address, a protocol type supported by a packet, quintuple information of the packet, and the like.

The second packet forwarding device is further configured to locally perform, according to the local cleaning response policy, cleaning processing on the traffic flowing to the destination IP address.

The dynamic diversion and cleaning response policy is used to instruct the second packet forwarding device to send the traffic flowing to the destination IP address to a cleaning device for cleaning processing. Optionally, the dynamic diversion and cleaning response policy may include the destination IP address and diversion path indication information.

The second packet forwarding device is further configured to send, according to the dynamic diversion and cleaning response policy, the traffic flowing to the destination IP address to the cleaning device for cleaning processing.

For the dynamic diversion and cleaning response policy, before delivering the dynamic diversion and cleaning response policy using the southbound interface unit, the controller needs to determine a path with minimum network impact to divert the traffic. The following describes several possible implementations.

Manner 1: The statistical data further includes a load value of the first packet forwarding device.

Before delivering the DDoS prevention policy to the second packet forwarding device, the controller is further configured to determine a first diversion path according to the load value of the first packet forwarding device, where the first diversion path is a path with a minimum load between the second packet forwarding device and the cleaning device, and the first diversion path includes the second packet forwarding device and the cleaning device.

The DDoS prevention policy delivered to the second packet forwarding device is the dynamic diversion and cleaning response policy, the dynamic diversion and cleaning response policy includes indication information of first diversion path, and the indication information of the first diversion path is used to instruct the second packet forwarding device to send, through the first diversion path, the traffic flowing to the destination IP address to the cleaning device for cleaning processing.

The second packet forwarding device is further configured to send, through the first diversion path, the traffic flowing to the destination IP address to the cleaning device for cleaning processing.

Manner 2: Before delivering the DDoS prevention policy to the second packet forwarding device, the controller is further configured to determine a second diversion path according to an SDN topological relationship, where the second diversion path is a shortest path between the second packet forwarding device and the cleaning device, and the SDN topological relationship includes a connection relationship between the packet forwarding devices in the SDN and a connection relationship between one or more packet forwarding devices and the cleaning device.

The DDoS prevention policy delivered to the second packet forwarding device is the dynamic diversion and cleaning response policy. The dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing.

The second packet forwarding device is further configured to send, through the second diversion path, the traffic flowing to the destination IP address to the cleaning device for cleaning processing.

On a basis of FIG. 2 and FIG. 3, the following describes each node in an SDN-based DDoS attack prevention system.

Figure 4:
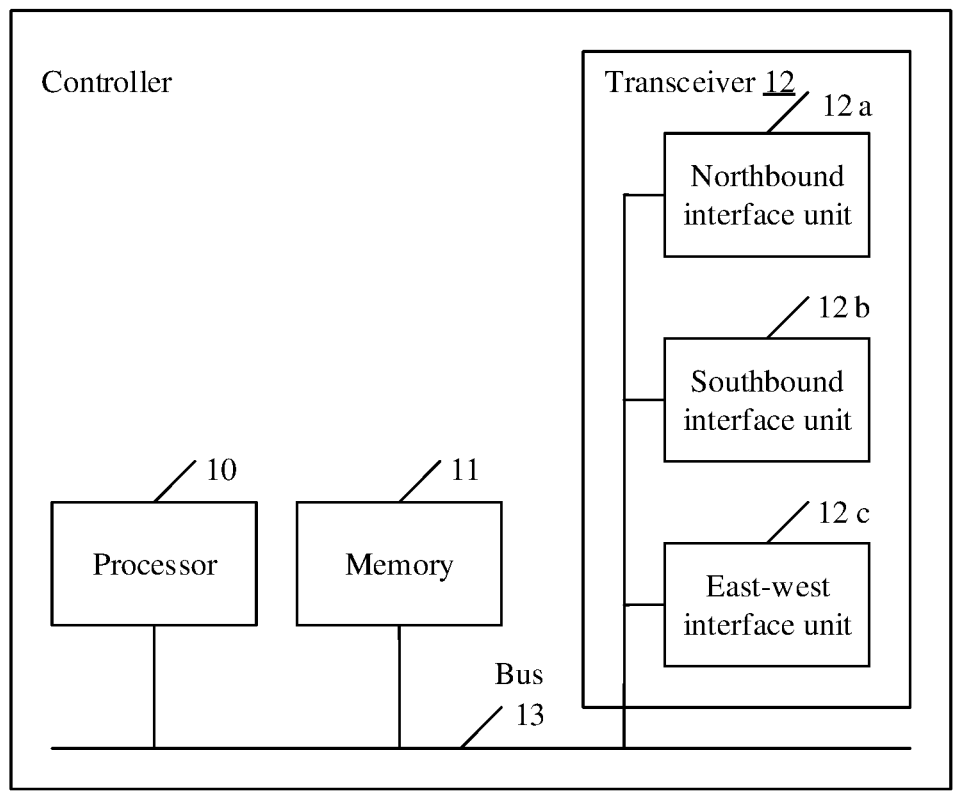
FIG. 4 is a schematic structural diagram of a controller according to an embodiment of the present disclosure.

FIG. 4 is a schematic structural diagram of a controller according to an embodiment of the present disclosure. Referring to FIG. 4, the controller includes a processor 10, a memory 11, a transceiver 12, and a bus 13.

The transceiver 12 includes a northbound interface unit 12a, a southbound interface unit 12b, and an east-west interface unit 12c.

The processor 10 is configured to execute a DDoS control program to obtain a DDoS prevention configuration parameter, and instruct, based on the DDoS prevention configuration parameter, the southbound interface unit 12b to interact with a packet forwarding device and a cleaning device in order to implement a configuration related to the foregoing DDoS prevention solution. For example, the DDoS prevention configuration parameter is a destination IP address. The processor 10 instructs the southbound interface unit 12b to deliver a traffic statistics collection instruction to a first packet forwarding device. The traffic statistics collection instruction carries the destination IP address. The southbound interface unit 12b receives statistical data sent by the first packet forwarding device. The statistical data includes statistical information of traffic flowing to the destination IP address.

It should be noted that the DDoS prevention configuration parameter may be obtained from user equipment using the northbound interface unit 12a.

Further, the processor 10 obtains, according to the statistical data received by the southbound interface unit 12b, a statistical value of global traffic flowing to the destination IP address, and determines whether the statistical value of the global traffic exceeds a preset threshold.

The statistical value of the global traffic indicates a statistical value that is used to reflect traffic flowing to the destination IP address within a range of an SDN and that is obtained after the controller summarizes statistical data reported by at least two packet forwarding devices including the first packet forwarding device.

Further, if a network attack occurs, the processor 10 instructs, based on a determining result that the statistical value of the global traffic exceeds the preset threshold, the southbound interface unit 12b to send a DDoS prevention policy to a second packet forwarding device.

Optionally, when the controller has the foregoing controller scheduling function, the processor 10 directly instructs the southbound interface unit 12b to interact with the packet forwarding device and the cleaning device in order to implement a configuration related to the foregoing DDoS prevention solution. If a system further includes the foregoing independent scheduling device, the processor 10 instructs the east-west interface unit 12c to interact with the independent scheduling device in order to implement the configuration related to the foregoing controller scheduling function. It should be noted that the northbound interface unit 12a and the east-west interface unit 12c are optional units. For a controller that can execute a DDoS control program by itself, the northbound interface unit 12a may not be disposed. For a controller that has the foregoing controller scheduling function, the east-west interface unit 12c may not be disposed.

The memory 11 is configured to store the DDoS prevention configuration parameter, the DDoS control program, the statistical data reported by the first packet forwarding device, the DDoS prevention policy, and the like, which are to be called by the processor 10 in a corresponding operation.

According to the controller provided in this embodiment of the present disclosure, the processor 10 instructs the southbound interface unit 12b to deliver a traffic statistics collection instruction to a first packet forwarding device. The traffic statistics collection instruction is used to instruct the first packet forwarding device to perform traffic statistics collection, and the traffic statistics collection instruction carries a destination IP address. The southbound interface unit 12b receives statistical data reported by the first packet forwarding device according to the traffic statistics collection instruction. The statistical data includes statistical information of traffic flowing to the destination IP address. The processor 10 obtains, according to the statistical data received by the southbound interface unit 12b, a statistical value of global traffic flowing to the destination IP address. The statistical value of the global traffic indicates a statistical value that is used to reflect traffic flowing to the destination IP address within a range of an SDN and that is obtained after the controller summarizes statistical data reported by at least two packet forwarding devices including the first packet forwarding device. The processor 10 determines whether the statistical value of the global traffic exceeds a preset threshold. The processor 10 instructs, based on a determining result that the statistical value of the global traffic exceeds the preset threshold, the southbound interface unit 12b to deliver a DDoS prevention policy to a second packet forwarding device. This reduces impact of a DDoS attack on a network and improves network security.

Optionally, the traffic statistics collection instruction further carries a detection start time.

The detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period.

Further, the controller needs a mechanism to determine whether a network attack stops. A possible implementation is as follows.

The processor 10 is further configured to determine that the statistical value of the global traffic does not exceed the preset threshold in at least two detection periods.

The southbound interface unit 12b is further configured to deliver a prevention cancellation instruction message to the second packet forwarding device based on a result, determined by the processor 10, that the statistical value of the global traffic does not exceed the preset threshold in the at least two successive detection periods.

The prevention cancellation instruction message is used to instruct the second packet forwarding device to stop executing the DDoS prevention policy.

Optionally, the controller may further deliver the DDoS prevention policy to a packet forwarding device that is close to an attack source and that is located on an SDN edge. A possible implementation is as follows.

Before the southbound interface unit 12b delivers the DDoS prevention policy to the second packet forwarding device, the processor 10 is further configured to determine, according to the statistical data received by the southbound interface unit 12b, a packet forwarding device closest to an attack source on an attack path, and use the packet forwarding device closest to the attack source as the second packet forwarding device.

The southbound interface unit 12b is further configured to deliver the DDoS prevention policy to the second packet forwarding device.

Further, the statistical information of the traffic flowing to the destination IP address includes a volume of the traffic flowing from the first packet forwarding device to the destination IP address. The processor 10 determines a first attack path according to the volume, received by the southbound interface unit 12b, of the traffic flowing from the first packet forwarding device to the destination IP address. The first attack path is an attack path, of at least one attack path, with a maximum volume of traffic flowing to the destination IP address. The processor 10 determines, according to the first attack path, the packet forwarding device closest to the attack source.

The packet forwarding device closest to the attack source is located on an SDN edge that is on the first attack path and that is on a side of a source address of the traffic flowing to the destination IP address.

Optionally, the DDoS prevention policy includes any one of a black-hole route response policy, a traffic limiting response policy, a rate limiting response policy, a discarding response policy, a local cleaning response policy, or a dynamic diversion and cleaning response policy. The controller delivers a response instruction.

For the dynamic diversion and cleaning response policy, before the southbound interface unit 12b delivers the dynamic diversion and cleaning response policy, the controller needs to determine a path with minimum network impact to divert the traffic. The following describes several possible implementations.

Manner 1: The statistical data further includes a load value of the first packet forwarding device.

The processor 10 is configured to determine a first diversion path according to the load value of the first packet forwarding device.

The first diversion path is a path with a minimum load between the second packet forwarding device and the cleaning device, and the first diversion path includes the second packet forwarding device and the cleaning device.

In this case, the southbound interface unit 12b delivers the dynamic diversion and cleaning response policy to the second packet forwarding device according to the first diversion path determined by the processor 10. The dynamic diversion and cleaning response policy includes indication information of the first diversion path, and the indication information of the first diversion path is used to instruct the second packet forwarding device to send, through the first diversion path, the traffic flowing to the destination IP address to the cleaning device for cleaning processing.

Manner 2: The processor 10 is configured to determine a second diversion path according to an SDN topological relationship. The second diversion path is a shortest path between the second packet forwarding device and the cleaning device, and the SDN topological relationship includes a connection relationship between the packet forwarding devices in the SDN and a connection relationship between one or more packet forwarding devices and the cleaning device.

The southbound interface unit 12b delivers the dynamic diversion and cleaning response policy to the second packet forwarding device according to the second diversion path determined by the processor 10. The dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing.

Further, the following uses a secondary controller and a primary controller as an example to describe interaction between the controller and the independent scheduling device. The primary controller may cooperate, in two possible implementations, with the secondary controller to implement the attack prevention solution.

Manner 1: The primary controller obtains working statuses of all of secondary controllers in the SDN, the packet forwarding devices, and the cleaning device. Each secondary controller periodically interacts with the first packet forwarding device using a southbound interface unit to obtain statistical data, each secondary controller sends the collected statistical data to the primary controller using a respective east-west interface unit, and then the primary controller obtains a statistical value of global traffic after performing summarization, and determines, according to the statistical value of the global traffic, whether a network attack occurs. The primary controller negotiates with the secondary controllers to formulate an agreed network attack prevention policy, for example, the DDoS prevention policy, and the secondary controllers deliver the network attack prevention policy to the second packet forwarding device using southbound interface units.

Manner 2: The primary controller selects an idle secondary controller to complete the attack prevention solution. For example, the primary controller interacts with a secondary controller using an east-west interface unit, and the primary controller instructs the secondary controller to complete the attack prevention solution. The secondary controller periodically interacts with the first packet forwarding device using a southbound interface unit to obtain statistical data. The secondary controller summarizes the collected statistical data to obtain a statistical value of global traffic, and determines, according to the statistical value of the global traffic, whether a network attack occurs, and the secondary controller delivers the network attack prevention policy to the second packet forwarding device using the southbound interface unit.

Figure 5:
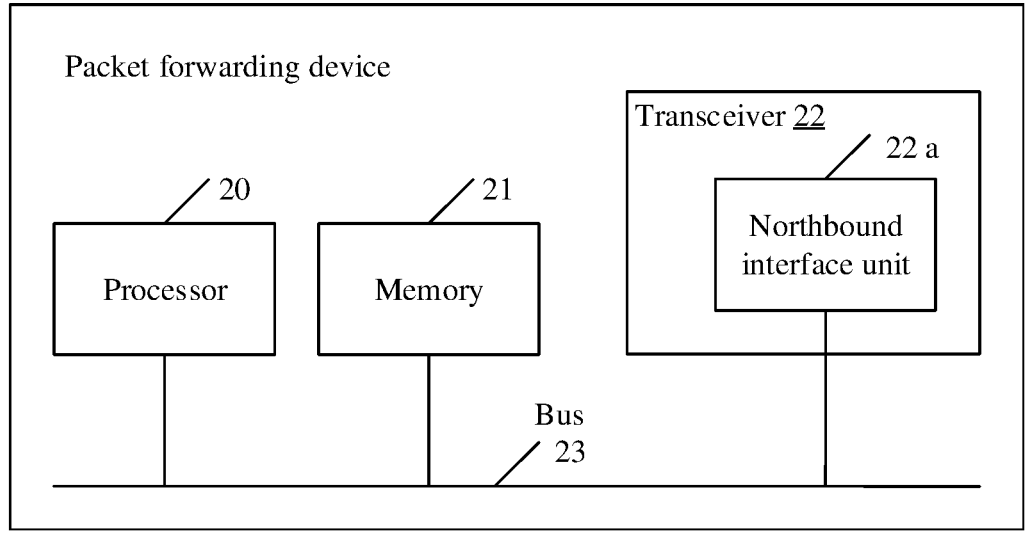
FIG. 5 is a schematic structural diagram of a packet forwarding device according to an embodiment of the present disclosure.

FIG. 5 is a schematic structural diagram of a packet forwarding device according to an embodiment of the present disclosure. The packet forwarding device is the foregoing first packet forwarding device in a traffic statistics collection process, and is the foregoing second packet forwarding device in a DDoS prevention policy execution process. Referring to FIG. 5, the packet forwarding device includes a processor 20, a memory 21, a transceiver 22, and a bus 23.

The transceiver 22 includes a northbound interface unit 22a.

First, when the packet forwarding device serves as the first packet forwarding device, the packet forwarding device has the following functions.

The northbound interface unit 22a is connected to a southbound interface unit of a controller and is configured to receive a related parameter, for example, a traffic statistics collection instruction, configured by the controller for a DDoS attack, and report related data, for example, statistical data, obtained by means of detection for the DDoS attack to the controller. The traffic statistics collection instruction carries a destination IP address and is used to instruct the processor 20 to perform traffic statistics collection. The statistical data includes statistical information of traffic flowing to the destination IP address.

The processor 20 is configured to perform statistics collection on the traffic flowing to the destination IP address according to the traffic statistics collection instruction received by the northbound interface unit 22a to obtain the statistical information of the traffic flowing to the destination IP address.

The memory 21 is configured to store the related parameter configured by the controller for the DDoS attack, the statistical data, and the like.

According to the first packet forwarding device provided in this embodiment of present disclosure, the northbound interface unit 22a receives a related parameter, for example, a traffic statistics collection instruction, configured by a controller for a DDoS attack. The traffic statistics collection instruction carries a destination IP address and is used to instruct the processor 20 to perform traffic statistics collection. Further, the processor 20 performs, according to the traffic statistics collection instruction received by the northbound interface unit 22a, statistics collection on traffic flowing to the destination IP address to obtain statistical information of the traffic flowing to the destination IP address. The northbound interface unit 22a reports related data, for example, statistical data, obtained by means of detection for the DDoS attack to the controller. The statistical data includes the statistical information of the traffic flowing to the destination IP address. The first packet forwarding device performs the traffic statistics collection on the traffic flowing to the destination IP address, and reports the statistical data to the controller such that the controller can determine, based on the statistical data, whether a DDoS attack occurs, and trigger a corresponding DDoS prevention policy. This reduces impact of a DDoS attack on a network and improves network security.

Optionally, the traffic statistics collection instruction further carries a detection start time.

The detection start time is used to notify the processor 20 of a start time of the traffic statistics collection, the traffic statistics collection is continuously performed according to a detection period, and the statistical data is reported to the controller according to the detection period.

Still referring to FIG. 5, when the packet forwarding device serves as the second packet forwarding device, the packet forwarding device has the following functions.

After reporting the statistical data to the controller, the northbound interface unit 22a is further configured to receive a DDoS prevention policy sent by the controller.

The processor 20 is further configured to perform, according to the DDoS prevention policy received by the northbound interface unit 22a, prevention processing on the traffic flowing to the destination IP address.

According to the second packet forwarding device provided in this embodiment, after the northbound interface unit 22a reports statistical data to a controller, the northbound interface unit 22a receives a DDoS prevention policy sent by the controller, and the processor 20 performs, according to the DDoS prevention policy received by the northbound interface unit, prevention processing on traffic flowing to a destination IP address. This implements DDoS prevention on the traffic flowing to the destination IP address, reduces impact of a DDoS attack on a network, and improves network security.

It should be noted that some packet forwarding devices in an SDN have functions of both the first packet forwarding device and the second packet forwarding device. These packet forwarding devices are usually packet forwarding devices that can maximize a prevention effect of the executed DDoS prevention policy, for example, a packet forwarding device that is close to an attack source and that is located on an SDN edge. Other packet forwarding devices in the SDN have only a function of the first packet forwarding device, for example, a packet forwarding device that is not located on the SDN edge. Certainly, according to specific deployment of the SDN and a specific scenario in which a network attack occurs, the controller may configure, according to a requirement, that a packet forwarding device in the SDN has functions/a function of the first packet forwarding device and/or the second packet forwarding device. This is not limited in this embodiment of the present disclosure.

Further, corresponding to a mechanism used by the controller to determine whether a network attack stops, corresponding functions on a second packet forwarding device side are as follows.

After receiving the DDoS prevention policy sent by the controller, the northbound interface unit 22a is further configured to receive a prevention cancellation instruction message sent by the controller, where the prevention cancellation instruction message is used to instruct the processor 20 to stop executing the DDoS prevention policy.

The processor 20 is further configured to stop, according to the prevention cancellation instruction message received by the northbound interface unit 22a, performing prevention processing on the traffic flowing to the destination IP address.

Optionally, the DDoS prevention policy includes any one of a black-hole route response policy, a traffic limiting response policy, a rate limiting response policy, a discarding response policy, a local cleaning response policy, or a dynamic diversion and cleaning response policy.

The black-hole route response policy is used to instruct the processor 20 to perform, by configuring a black-hole route, packet discarding processing on the traffic flowing to the destination IP address.

The processor 20 is further configured to perform, using a black-hole route according to the black-hole route response policy received by the northbound interface unit 22a, packet discarding processing on the traffic flowing to the destination IP address.

The traffic limiting response policy is used to instruct the processor 20 to perform traffic limiting processing on the traffic flowing to the destination IP address.

The processor 20 is further configured to perform, according to the traffic limiting response policy received by the northbound interface unit 22a, traffic limiting processing on the traffic flowing to the destination IP address.

The rate limiting response policy is used to instruct the processor 20 to perform rate limiting processing on the traffic flowing to the destination IP address.

The processor 20 is further configured to perform, according to the rate limiting response policy received by the northbound interface unit 22a, rate limiting processing on the traffic flowing to the destination IP address.

The discarding response policy is used to instruct the processor 20 to perform packet discarding processing on the traffic flowing to the destination IP address.

The processor 20 is further configured to perform, according to the discarding response policy received by the northbound interface unit 22a, packet discarding processing on the traffic flowing to the destination IP address.

The local cleaning response policy is used to instruct the processor 20 to locally perform cleaning processing on the traffic flowing to the destination IP address.

The processor 20 is further configured to locally perform, according to the local cleaning response policy received by the northbound interface unit 22a, cleaning processing on the traffic flowing to the destination IP address.

The dynamic diversion and cleaning response policy is used to instruct the processor 20 to send the traffic flowing to the destination IP address to a cleaning device for cleaning processing.

The processor 20 is further configured to instruct, according to the dynamic diversion and cleaning response policy received by the northbound interface unit 22a, the northbound interface unit 22a to send the traffic flowing to the destination IP address to the cleaning device for cleaning processing.

For the dynamic diversion and cleaning response policy, before the controller delivers the dynamic diversion and cleaning response policy, the controller needs to determine a path with minimum network impact to divert the traffic. The second packet forwarding device side has the following corresponding functions.

Manner 1:

The statistical data further includes a load value of the first packet forwarding device.

The dynamic diversion and cleaning response policy includes indication information of the first diversion path. The indication information of the first diversion path is used to instruct to send, through a first diversion path, the traffic flowing to the destination IP address to the cleaning device for cleaning processing. The first diversion path is a path with a minimum load between the packet forwarding device and the cleaning device, and the first diversion path includes the second packet forwarding device and the cleaning device.

The packet forwarding device is the second packet forwarding device.

The processor 20 is further configured to instruct, according to the dynamic diversion and cleaning response policy received by the northbound interface unit 22a, the northbound interface unit 22a to send, through the first diversion path, the traffic flowing to the destination IP address to the cleaning device for cleaning processing.

Manner 2:

The dynamic diversion and cleaning response policy includes indication information of the second diversion path. The indication information of the second diversion path is used to instruct to send, through a second diversion path, the traffic flowing to the destination IP address to the cleaning device for cleaning processing. The second diversion path is a shortest path between the packet forwarding device and the cleaning device.

The packet forwarding device is the second packet forwarding device.

The processor 20 is further configured to instruct, according to the dynamic diversion and cleaning response policy received by the northbound interface unit 22a, the northbound interface unit 22a to send, through the second diversion path, the traffic flowing to the destination IP address to the cleaning device for cleaning processing.

Figure 6:
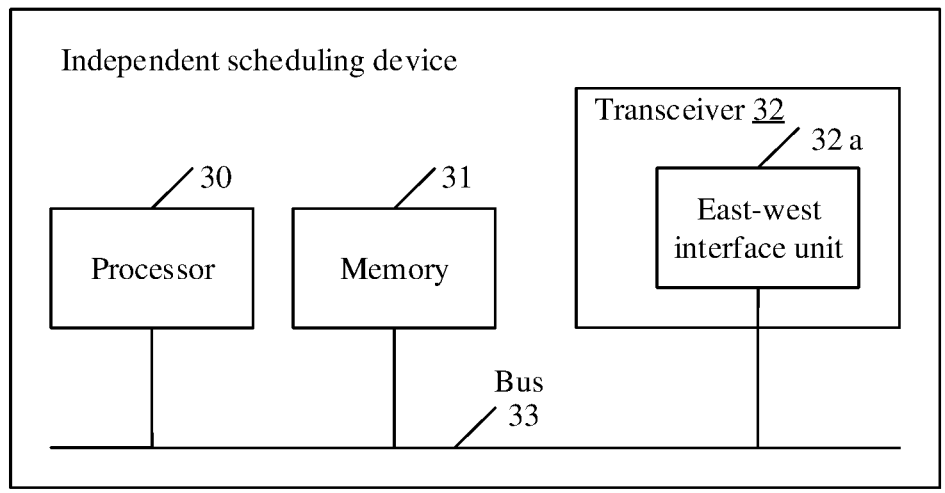
FIG. 6 is a schematic structural diagram of an independent scheduling device according to an embodiment of the present disclosure.

FIG. 6 is a schematic structural diagram of an independent scheduling device according to an embodiment of the present disclosure. Referring to FIG. 6, the independent scheduling device includes a processor 30, a memory 31, a transceiver 32, and a bus 33.

The transceiver 32 includes an east-west interface unit 32a.

Further, for the independent scheduling device, there may be two possible implementations. The following separately describes the two manners.

Manner 1:

The east-west interface unit 32a of the independent scheduling device is connected to an east-west interface unit of a controller.

The processor 30 is configured to instruct the east-west interface unit 32a to send a traffic statistics collection instruction to the controller such that the controller delivers the traffic statistics collection instruction to a first packet forwarding device.

Optionally, the traffic statistics collection instruction may also be delivered by the controller itself to the first packet forwarding device, and with no need to send the traffic statistics collection instruction to the controller by the east-west interface unit 32a.

The east-west interface unit 32a is further configured to receive statistical data sent by the controller.

Further, the controller collects statistical data reported by the first packet forwarding device according to the traffic statistics collection instruction, and sends the statistical data to the east-west interface unit 32a of the independent scheduling device.

The processor 30 is configured to obtain, according to the statistical data received by the east-west interface unit 32a, a statistical value of global traffic flowing to a destination IP address, and determine, according to the statistical value of the global traffic, whether a network attack occurs.

The statistical value of the global traffic indicates a statistical value that is used to reflect traffic flowing to the destination IP address within a range of the SDN and that is obtained after the controller summarizes statistical data reported by at least two packet forwarding devices including the first packet forwarding device.

If a network attack occurs, the processor 30 negotiates with the controller using the east-west interface unit 32a to determine a DDoS prevention policy, and instructs the controller to deliver the determined DDoS prevention policy to a second packet forwarding device.

Manner 2:

The east-west interface unit 32a of the independent scheduling device is connected to an east-west interface unit 12c of a controller.

The east-west interface unit 32a receives a DDoS prevention request message sent by the controller.

The processor 30 determines, according to the DDoS prevention request message and controller status information, a controller that is configured to execute a DDoS prevention function.

Further, when a cluster includes multiple controllers, an independent scheduling device is usually disposed to facilitate management of the multiple controllers. Therefore, the processor 30 needs to select, based on the controller status information, a controller that can execute a DDoS prevention function. The controller status information may include processing capability information, a load status, an idle status, and the like that are of each controller in the cluster. After determining the controller that can execute the DDoS prevention function, the independent scheduling device sends a DDoS prevention response message to the controller. The DDoS prevention response message includes a DDoS prevention execution instruction. The controller executes a DDoS prevention function according to the DDoS prevention execution instruction. For specific functions, refer to the solution in the embodiment corresponding to FIG. 4.

In Manner 1, there may be multiple mechanisms for negotiation between the independent scheduling device and the controller. For example, statistical information of the traffic flowing to the destination IP address includes a volume of the traffic flowing from the first packet forwarding device to the destination IP address. The independent scheduling device determines a first attack path according to the volume of the traffic flowing from the first packet forwarding device to the destination IP address, where the first attack path is an attack path, of at least one attack path, with a maximum volume of traffic flowing to the destination IP address, and determines, according to the first attack path, a packet forwarding device closest to the attack source. The packet forwarding device closest to the attack source is located on an SDN edge that is on the first attack path and that is on a side of a source address of the traffic flowing to the destination IP address. The independent scheduling device instructs the controller to set the packet forwarding device closest to the attack source as the second packet forwarding device, and deliver the DDoS prevention policy to the second packet forwarding device. For another example, after determining to set a dynamic diversion and cleaning response policy, the independent scheduling device determines a first diversion path according to a load value of the first packet forwarding device. The first diversion path is a path with a minimum load between the second packet forwarding device and the cleaning device. The independent scheduling device delivers the dynamic diversion and cleaning response policy to the controller. The policy includes indication information of the first diversion path. The indication information of the first diversion path is used to instruct the second packet forwarding device to send, through the first diversion path, the traffic flowing to the destination IP address to the cleaning device for cleaning processing. For another example, after determining to set a dynamic diversion and cleaning response policy, the independent scheduling device determines a second diversion path according to an SDN topological relationship. The second diversion path is a shortest path between the second packet forwarding device and the cleaning device. The SDN topological relationship includes a connection relationship between the packet forwarding devices in the SDN and a connection relationship between one or more packet forwarding devices and the cleaning device. The independent scheduling device delivers the dynamic diversion and cleaning response policy to the controller. The policy includes indication information of the second diversion path. The indication information of the second diversion path is used to instruct the second packet forwarding device to send, through the second diversion path, the traffic flowing to the destination IP address to the cleaning device for cleaning processing. Certainly, there may be multiple possible mechanisms for negotiation between the independent scheduling device and the controller. This is not limited in this embodiment of the present disclosure.

Figure 7:
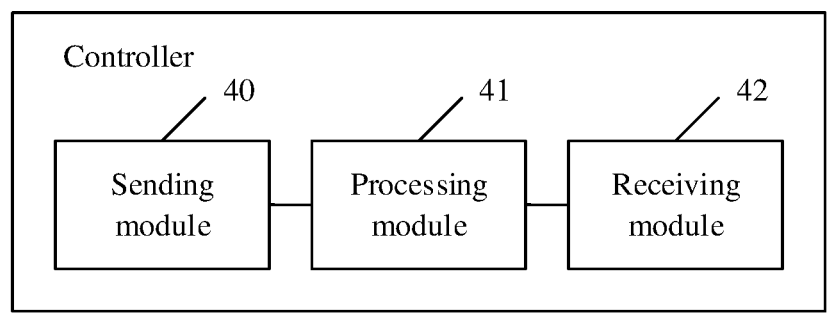
FIG. 7 is a schematic structural diagram of a controller according to an embodiment of the present disclosure.

Optionally, for the foregoing controller, there may be another possible implementation. Further, FIG. 7 is a schematic structural diagram of a controller according to an embodiment of the present disclosure. Referring to FIG. 7, the controller includes a sending module 40, a processing module 41, and a receiving module 42.

The sending module 40 is configured to deliver a traffic statistics collection instruction to a first packet forwarding device. The traffic statistics collection instruction is used to instruct the first packet forwarding device to perform traffic statistics collection, and the traffic statistics collection instruction carries a destination IP address.

The receiving module 42 is configured to collect statistical data reported by the first packet forwarding device according to the traffic statistics collection instruction. The statistical data includes statistical information of traffic flowing to the destination IP address.

The processing module 41 is configured to obtain, according to the statistical data received by the receiving module 42, a statistical value of global traffic flowing to the destination IP address, where the statistical value of the global traffic indicates a statistical value that is used to reflect traffic flowing to the destination IP address within a range of an SDN and that is obtained after the controller summarizes statistical data reported by at least two packet forwarding devices including the first packet forwarding device, and determine whether the statistical value of the global traffic exceeds a preset threshold.

The sending module 40 is further configured to deliver a DDoS prevention policy to a second packet forwarding device based on a determining result, determined by the processing module 41, that the statistical value of the global traffic exceeds the preset threshold.

According to the controller provided in this embodiment of the present disclosure, the processing module 41 instructs the sending module 40 to deliver a traffic statistics collection instruction to a first packet forwarding device. The traffic statistics collection instruction is used to instruct the first packet forwarding device to perform traffic statistics collection, and the traffic statistics collection instruction carries a destination IP address. The receiving module 42 receives statistical data reported by the first packet forwarding device according to the traffic statistics collection instruction. The statistical data includes statistical information of traffic flowing to the destination IP address. The processing module 41 obtains, according to the statistical data received by the receiving module 42, a statistical value of global traffic flowing to the destination IP address. The statistical value of the global traffic indicates a statistical value that is used to reflect traffic flowing to the destination IP address within a range of an SDN and that is obtained after the controller summarizes statistical data reported by at least two packet forwarding devices including the first packet forwarding device. The processing module 41 determines whether the statistical value of the global traffic exceeds a preset threshold. The sending module 40 delivers a DDoS prevention policy to a second packet forwarding device based on a determining result, determined by the processing module 41, that the statistical value of the global traffic exceeds the preset threshold. This reduces impact of a DDoS attack on a network and improves network security.

Optionally, the traffic statistics collection instruction further carries the foregoing detection start time.

Further, the controller needs a mechanism used to determine whether a network attack stops. A possible implementation is as follows.

The processing module 41 is further configured to determine that the statistical value of the global traffic does not exceed the preset threshold in at least two successive detection periods.

The sending module 40 is further configured to deliver the foregoing prevention cancellation instruction message to the second packet forwarding device based on a result, determined by the processing module 41, that the statistical value of the global traffic does not exceed the preset threshold in the at least two successive detection periods.

Optionally, the controller may further deliver the DDoS prevention policy to a packet forwarding device that is close to an attack source and that is located on an SDN edge. A possible implementation includes determining, according to the statistical data received by the receiving module 42, a packet forwarding device closest to an attack source on an attack path, and using the packet forwarding device closest to the attack source as the second packet forwarding device.

Further, the statistical information of the traffic flowing to the destination IP address includes a volume of the traffic flowing from the first packet forwarding device to the destination IP address.

The processing module 41 is further configured to determine a first attack path according to the volume of the traffic that is received by the receiving module 42 and that is flowing from the first packet forwarding device to the destination IP address, where the first attack path is an attack path, of at least one attack path, with a maximum volume of traffic flowing to the destination IP address, and determine, according to the first attack path, the packet forwarding device closest to the attack source, where the packet forwarding device closest to the attack source is located on an SDN edge that is on the first attack path and that is on a side of a source address of the traffic flowing to the destination IP address.

Optionally, the DDoS prevention policy includes any one of a black-hole route response policy, a traffic limiting response policy, a rate limiting response policy, a discarding response policy, a local cleaning response policy, or a dynamic diversion and cleaning response policy.

Further, the response policies are described in detail in the foregoing descriptions, and are not described repeatedly herein.

For the dynamic diversion and cleaning response policy, before the controller delivers the dynamic diversion and cleaning response policy, the controller needs to determine a path with minimum network impact to divert the traffic. The following describes several possible implementations.

Manner 1: The statistical data further includes a load value of the first packet forwarding device.

Before the sending module 40 delivers the DDoS prevention policy to the second packet forwarding device, the processing module 41 is further configured to determine a first diversion path according to the load value of the first packet forwarding device.

The first diversion path is a path with a minimum load between the second packet forwarding device and the cleaning device, and the first diversion path includes the second packet forwarding device and the cleaning device.

The DDoS prevention policy delivered by the sending module 40 to the second packet forwarding device according to the first diversion path determined by the processing module 41 is the dynamic diversion and cleaning response policy. The dynamic diversion and cleaning response policy includes indication information of the first diversion path, and the indication information of the first diversion path is used to instruct the second packet forwarding device to send, through the first diversion path, the traffic flowing to the destination IP address to the cleaning device for cleaning processing.

Manner 2: Before the sending module 40 delivers the DDoS prevention policy to the second packet forwarding device, the processing module 41 is further configured to determine a second diversion path according to an SDN topological relationship, where the second diversion path is a shortest path between the second packet forwarding device and the cleaning device, and the SDN topological relationship includes a connection relationship between the packet forwarding devices in the SDN and a connection relationship between one or more packet forwarding devices and the cleaning device.

The DDoS prevention policy delivered by the sending module 40 to the second packet forwarding device according to the second diversion path determined by the processing module 41 is the dynamic diversion and cleaning response policy. The dynamic diversion and cleaning response policy includes indication information of the second diversion path, and the indication information of the second diversion path is used to instruct the second packet forwarding device to send, through the second diversion path, the traffic flowing to the destination IP address to the cleaning device for cleaning processing.

Figure 8:
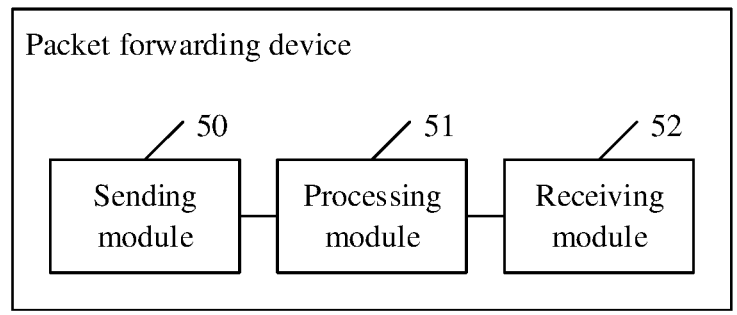
FIG. 8 is a schematic structural diagram of another packet forwarding device according to an embodiment of the present disclosure.

Optionally, for the foregoing packet forwarding device, there may be another possible implementation. FIG. 8 is a schematic structural diagram of another packet forwarding device according to an embodiment of the present disclosure. Referring to FIG. 8, the packet forwarding device includes a sending module 50, a processing module 51, and a receiving module 52.

The receiving module 52 is configured to receive a traffic statistics collection instruction sent by a controller. The traffic statistics collection instruction is used to instruct the processing module 51 to perform traffic statistics collection, and the traffic statistics collection instruction carries a destination IP address.

The processing module 51 is configured to collect, according to the traffic statistics collection instruction received by the receiving module 52, statistical information of traffic flowing to the destination IP address.

The sending module 50 is configured to report statistical data to the controller according to the statistical information, collected by the processing module 51, of the traffic flowing to the destination IP address. The statistical data includes the statistical information of the traffic flowing to the destination IP address.

The packet forwarding device provided in this embodiment of the present disclosure is the foregoing first packet forwarding device. The receiving module 52 receives a traffic statistics collection instruction sent by a controller. The traffic statistics collection instruction carries a destination IP address and is used to instruct the processing module 51 to perform traffic statistics collection. Further, the processing module 51 performs, according to the traffic statistics collection instruction received by the receiving module 52, statistics collection on traffic flowing to the destination IP address to obtain statistical information of the traffic flowing to the destination IP address. The sending module 50 reports statistical data to the controller. The statistical data includes the statistical information of the traffic flowing to the destination IP address. The first packet forwarding device performs the traffic statistics collection on the traffic flowing to the destination IP address, and reports the statistical data to the controller such that the controller can determine, based on the statistical data, whether a DDoS attack occurs, and trigger a corresponding DDoS prevention policy. This reduces impact of a DDoS attack on a network and improves network security.

Optionally, the traffic statistics collection instruction further carries the foregoing detection start time.

Further, when the packet forwarding device shown in FIG. 8 serves as a second packet forwarding device, the packet forwarding device has the following functions.

After the sending module 50 reports the statistical data to the controller, the receiving module 52 is further configured to receive a DDoS prevention policy sent by the controller.

The processing module 51 is further configured to perform, according to the DDoS prevention policy received by the receiving module 52, prevention processing on the traffic flowing to the destination IP address.

According to the second packet forwarding device provided in this embodiment, after the sending module 50 reports statistical data to a controller, the receiving module 52 receives a DDoS prevention policy sent by the controller, and the processing module 51 performs, according to the DDoS prevention policy received by the receiving module 52, prevention processing on traffic flowing to a destination IP address. This implements DDoS prevention on the traffic flowing to the destination IP address, reduces impact of a DDoS attack on a network, and improves network security.

Further, corresponding to a mechanism used by the controller to determine whether a network attack stops, corresponding functions on a second packet forwarding device side are as follows.

After receiving the DDoS prevention policy sent by the controller, the receiving module 52 is further configured to receive a prevention cancellation instruction message sent by the controller.

The processing module 51 is further configured to stop, according to the prevention cancellation instruction message received by the receiving module 52, performing prevention processing on the traffic flowing to the destination IP address.

Optionally, the DDoS prevention policy includes any one of a black-hole route response policy, a traffic limiting response policy, a rate limiting response policy, a discarding response policy, a local cleaning response policy, or a dynamic diversion and cleaning response policy.

The black-hole route response policy is used to instruct the processing module 51 to perform, by configuring a black-hole route, packet discarding processing on the traffic flowing to the destination IP address.

The processing module 51 is further configured to perform, using a black-hole route according to the black-hole route response policy received by the receiving module 52, packet discarding processing on the traffic flowing to the destination IP address.

The traffic limiting response policy is used to instruct the processing module 51 to perform traffic limiting processing on the traffic flowing to the destination IP address.

The processing module 51 is further configured to perform, according to the traffic limiting response policy received by the receiving module 52, traffic limiting processing on the traffic flowing to the destination IP address.

The rate limiting response policy is used to instruct the processing module 51 to perform rate limiting processing on the traffic flowing to the destination IP address.

The processing module 51 is further configured to perform, according to the rate limiting response policy received by the receiving module 52, rate limiting processing on the traffic flowing to the destination IP address.

The discarding response policy is used to instruct the processing module 51 to perform packet discarding processing on the traffic flowing to the destination IP address.

The processing module 51 is further configured to perform, according to the discarding response policy received by the receiving module 52, packet discarding processing on the traffic flowing to the destination IP address.

The local cleaning response policy is used to instruct the processing module 51 to locally perform cleaning processing on the traffic flowing to the destination IP address.

The processing module 51 is further configured to locally perform, according to the local cleaning response policy received by the receiving module 52, cleaning processing on the traffic flowing to the destination IP address.

The dynamic diversion and cleaning response policy is used to instruct the processing module 51 to send the traffic flowing to the destination IP address to a cleaning device for cleaning processing.

The processing module 51 is further configured to instruct, according to the dynamic diversion and cleaning response policy received by the receiving module 52, the sending module 50 to send the traffic flowing to the destination IP address to the cleaning device for cleaning processing.

For the dynamic diversion and cleaning response policy, before the controller delivers the dynamic diversion and cleaning response policy, the controller needs to determine a path with minimum network impact to divert the traffic. The second packet forwarding device side has the following corresponding functions.

Manner 1:

The dynamic diversion and cleaning response policy includes indication information of the first diversion path. The indication information of the first diversion path is used to instruct to send, through a first diversion path, the traffic flowing to the destination IP address to the cleaning device for cleaning processing. The first diversion path is a path with a minimum load between the packet forwarding device and the cleaning device, and the first diversion path includes the second packet forwarding device and the cleaning device.

The processing module 51 is further configured to instruct, according to the dynamic diversion and cleaning response policy received by the receiving module 52, the sending module 50 to send, through the first diversion path, the traffic flowing to the destination IP address to the cleaning device for cleaning processing.

Manner 2:

The dynamic diversion and cleaning response policy includes indication information of the second diversion path. The indication information of the second diversion path is used to instruct to send, through a second diversion path, the traffic flowing to the destination IP address to the cleaning device for cleaning processing. The second diversion path is a shortest path between the packet forwarding device and the cleaning device.

The processing module 51 is further configured to instruct, according to the dynamic diversion and cleaning response policy received by the receiving module 52, the sending module 50 to send, through the second diversion path, the traffic flowing to the destination IP address to the cleaning device for cleaning processing.

Figure 9:
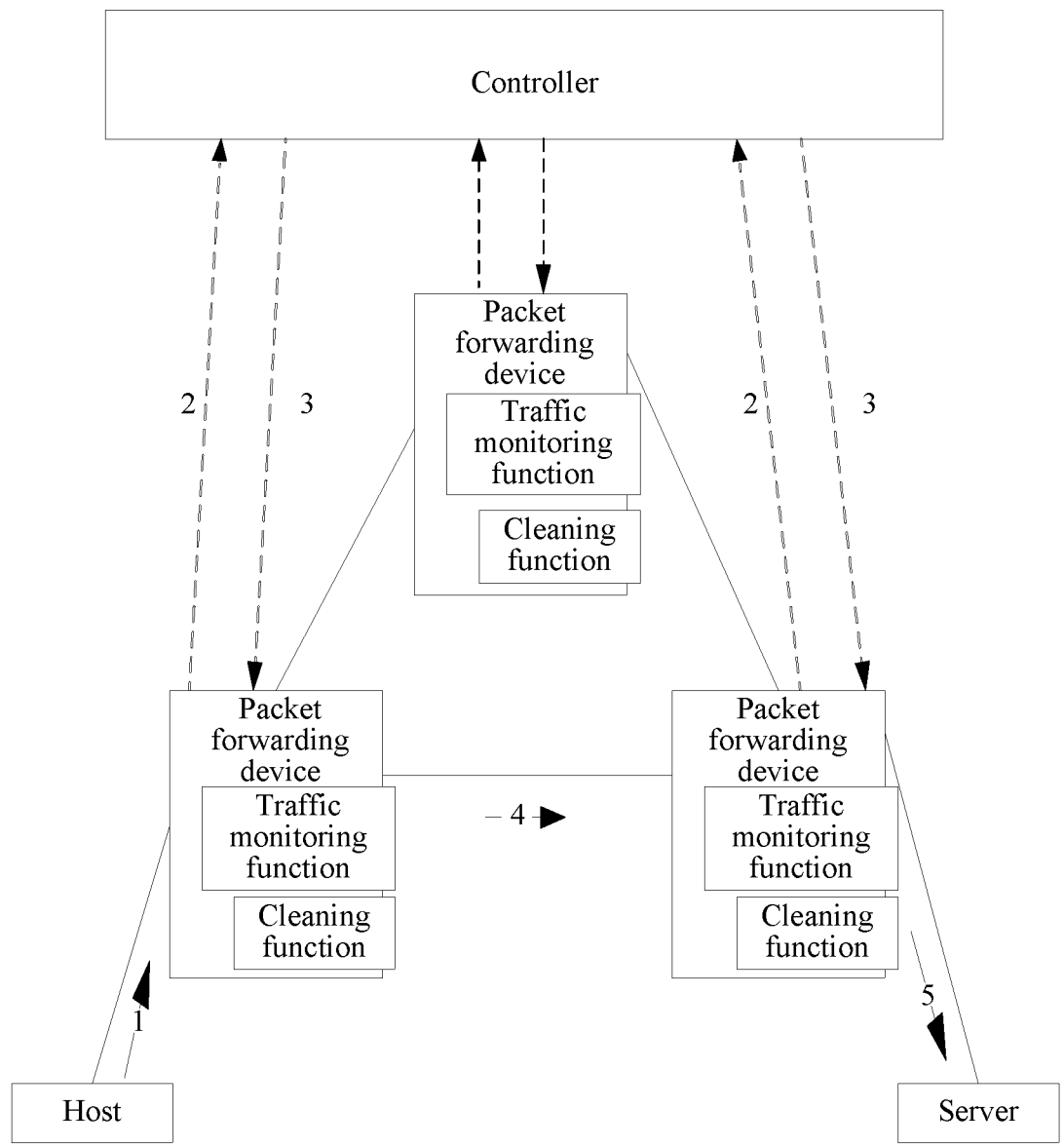
FIG. 9 is a schematic flowchart of an SDN-based DDoS attack prevention method according to an embodiment of the present disclosure.

On a basis of FIG. 2 to FIG. 8, FIG. 9 is a schematic flowchart of an SDN-based DDoS attack prevention method according to an embodiment of the present disclosure. Referring to FIG. 9, the flowchart includes the following steps (not shown).

Step 1: In general, data traffic flows along 1→4→5 to arrive at a server.

Step 2: A controller identifies a packet forwarding device located on an SDN edge. When the controller executes a DDoS control program or an application on user equipment calls a DDoS control program, the controller delivers a traffic statistics collection instruction to the packet forwarding device located on the SDN edge. The traffic statistics collection instruction is used to instruct the packet forwarding device to perform traffic statistics collection. In this case, the packet forwarding device located on the SDN edge is a first packet forwarding device. Optionally, the controller may deliver the traffic statistics collection instruction to all packet forwarding devices in the SDN.

Further, the traffic statistics collection instruction carries a destination IP address. The destination IP address is an IP address or an IP address segment of the server. The first packet forwarding device starts to perform, at a specific time and based on the traffic statistics collection instruction, statistics collection on traffic flowing to the destination IP address, to obtain statistical data. The statistical data includes statistical information of the traffic flowing to the destination IP address. The controller may query the statistical data from the first packet forwarding device at the end of a statistical period T. A process of delivering a policy and querying a statistical result by the controller is shown by, for example, a flow direction 3.

Step 3: After receiving the traffic statistics collection instruction, the first packet forwarding device creates a destination IP address monitoring table based on the destination IP address. The table is a hash table and includes all statistical items of the destination IP address. The first packet forwarding device performs, in each statistical period, statistics collection on traffic of a forwarded data packet whose destination address is the destination IP address. At the end of the statistical period, the controller queries the statistical data from the first packet forwarding device. A process of reporting the statistical data by the first packet forwarding device is shown by, for example, a flow direction 2.

Step 4: The controller obtains, by means of searching, all statistical data of the first packet forwarding device in a detection period T. The controller summarizes statistical information of the traffic flowing to the destination IP address to obtain a statistical value of global traffic flowing to the destination IP address. Further, the controller may perform an operation, for example, addition, on the statistical data to obtain the statistical value of the global traffic flowing to the destination IP address. The controller compares the statistical value of the global traffic with a preset threshold. If the preset threshold is exceeded, it is considered that a network attack occurs. If the statistical value of the global traffic is less than the preset threshold in several successive periods, it is considered that a network attack is eliminated.

Step 5: If a network attack occurs, the controller delivers a network attack prevention policy, for example, a DDoS prevention policy, to a second packet forwarding device.

Further, in step 5, the controller may determine a packet forwarding device closest to an attack source, and set the packet forwarding device closest to the attack source as the second packet forwarding device.

Step 6: After receiving the DDoS prevention policy, the second packet forwarding device may perform, based on the DDoS prevention policy, black-hole routing, traffic limiting (rate limiting), discarding, local cleaning, dynamic diversion and cleaning, or the like. Local cleaning means that a packet forwarding device performs DDoS prevention cleaning processing on traffic conforming to the DDoS prevention policy. Dynamic diversion and cleaning means that a packet forwarding device diverts traffic conforming to the DDoS prevention policy to a dedicated cleaning device for cleaning, and the cleaning device injects cleaned traffic to the SDN.

Step 7: After the second packet forwarding device receives a prevention cancellation instruction message sent by the controller, a normal traffic forwarding path is restored, diversion stops, and the cleaning device stops cleaning processing.

It should be noted that traffic statistics collection performed by the first packet forwarding device on the traffic flowing to the destination IP address is implemented by means of pipeline processing in a procedure specified in the OPENFLOW protocol. Further, first, the first packet forwarding device defines a destination IP address monitoring table as a flow table. When a destination IP address of specific traffic hits a destination IP address in the IP monitoring table, it is considered that an entry in the flow table is hit. The first packet forwarding device extracts information about a data packet of the traffic, and updates a statistical result of the entry. Generally, a form of the statistical result is expressed as Statistical value of the first packet forwarding device=Original statistical value of the first packet forwarding device+Quantity of data packets. The first packet forwarding device detects, at the same time, whether a detection period expires. If the detection period expires, the action item (action) is set as sending a statistical data log of the first packet forwarding device to the controller, and the statistical result temporarily stored in the first packet forwarding device is cleared, and a next statistical period starts.

The following describes the foregoing controller and packet forwarding device in the SDN using a specific embodiment.

Figure 10:
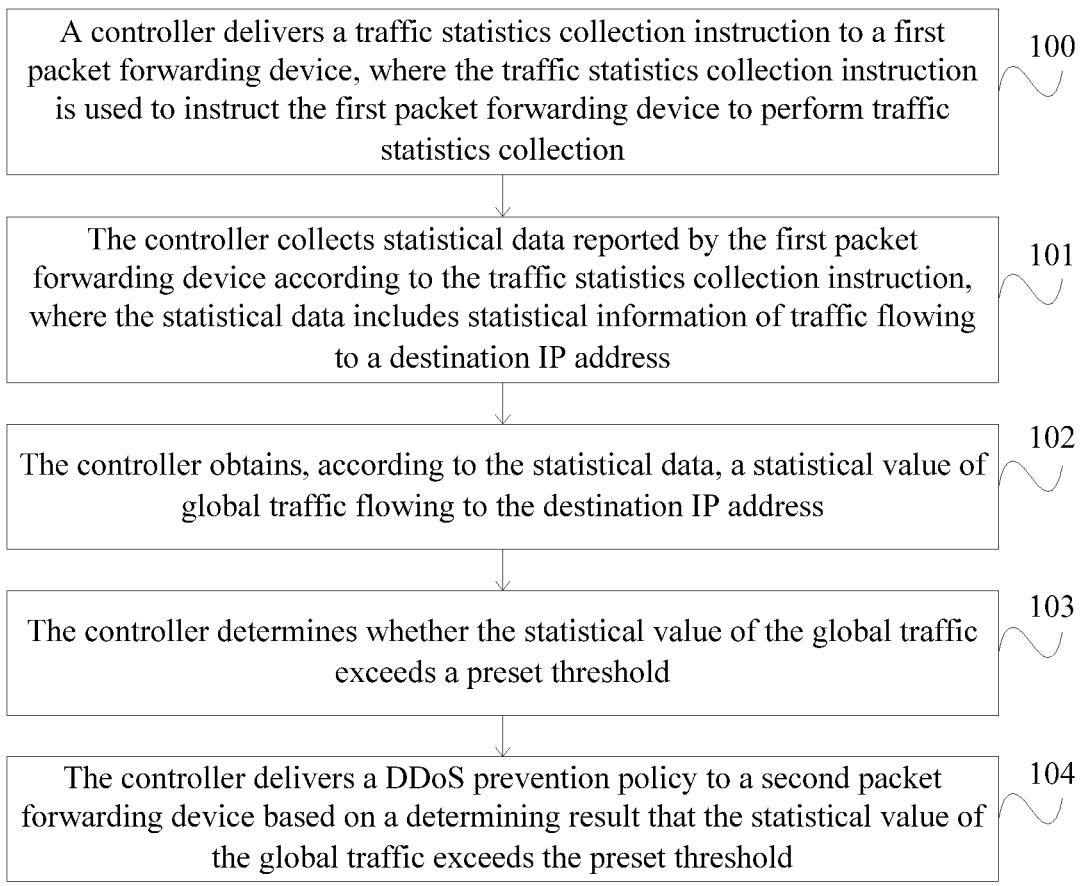
FIG. 10 is a schematic flowchart of another SDN-based DDoS attack prevention method according to an embodiment of the present disclosure.

FIG. 10 is a schematic flowchart of another SDN-based DDoS attack prevention method according to an embodiment of the present disclosure. The method is executed by the foregoing controller, and the controller may use the structure shown in FIG. 4 or FIG. 7. Referring to FIG. 10, the method includes the following steps.

Step 100: The controller delivers a traffic statistics collection instruction to a first packet forwarding device, where the traffic statistics collection instruction is used to instruct the first packet forwarding device to perform traffic statistics collection.

The traffic statistics collection instruction carries a destination IP address.

Step 101: The controller collects statistical data reported by the first packet forwarding device according to the traffic statistics collection instruction, where the statistical data includes statistical information of traffic flowing to a destination IP address.

Step 102: The controller obtains, according to the statistical data, a statistical value of global traffic flowing to the destination IP address.

The statistical value of the global traffic indicates a statistical value that is used to reflect traffic flowing to the destination IP address within a range of the SDN and that is obtained after the controller summarizes statistical data reported by at least two packet forwarding devices including the first packet forwarding device.

Step 103: The controller determines whether the statistical value of the global traffic exceeds a preset threshold.

Step 104: The controller delivers a DDoS prevention policy to a second packet forwarding device based on a determining result that the statistical value of the global traffic exceeds the preset threshold.

According to the SDN-based DDoS attack prevention method provided in this embodiment of the present disclosure, a controller delivers a traffic statistics collection instruction to a first packet forwarding device. The traffic statistics collection instruction is used to instruct the first packet forwarding device to perform traffic statistics collection, and the traffic statistics collection instruction carries a destination IP address. The controller collects statistical data reported by the first packet forwarding device according to the traffic statistics collection instruction. The statistical data includes statistical information of traffic flowing to the destination IP address. The controller obtains, according to the statistical data, a statistical value of global traffic flowing to the destination IP address. The statistical value of the global traffic indicates a statistical value that is used to reflect traffic flowing to the destination IP address within a range of the SDN and that is obtained after the controller summarizes statistical data reported by at least two packet forwarding devices including the first packet forwarding device. The controller determines whether the statistical value of the global traffic exceeds a preset threshold, and delivers a DDoS prevention policy to a second packet forwarding device based on a determining result that the statistical value of the global traffic exceeds the preset threshold. This reduces impact of a DDoS attack on a network and improves network security.

Optionally, the traffic statistics collection instruction further carries a detection start time.

The detection start time is used to notify the first packet forwarding device of a start time of the traffic statistics collection, the traffic statistics collection is continuously performed by the first packet forwarding device according to a detection period, and the statistical data is reported by the first packet forwarding device to the controller according to the detection period.

Figure 11:
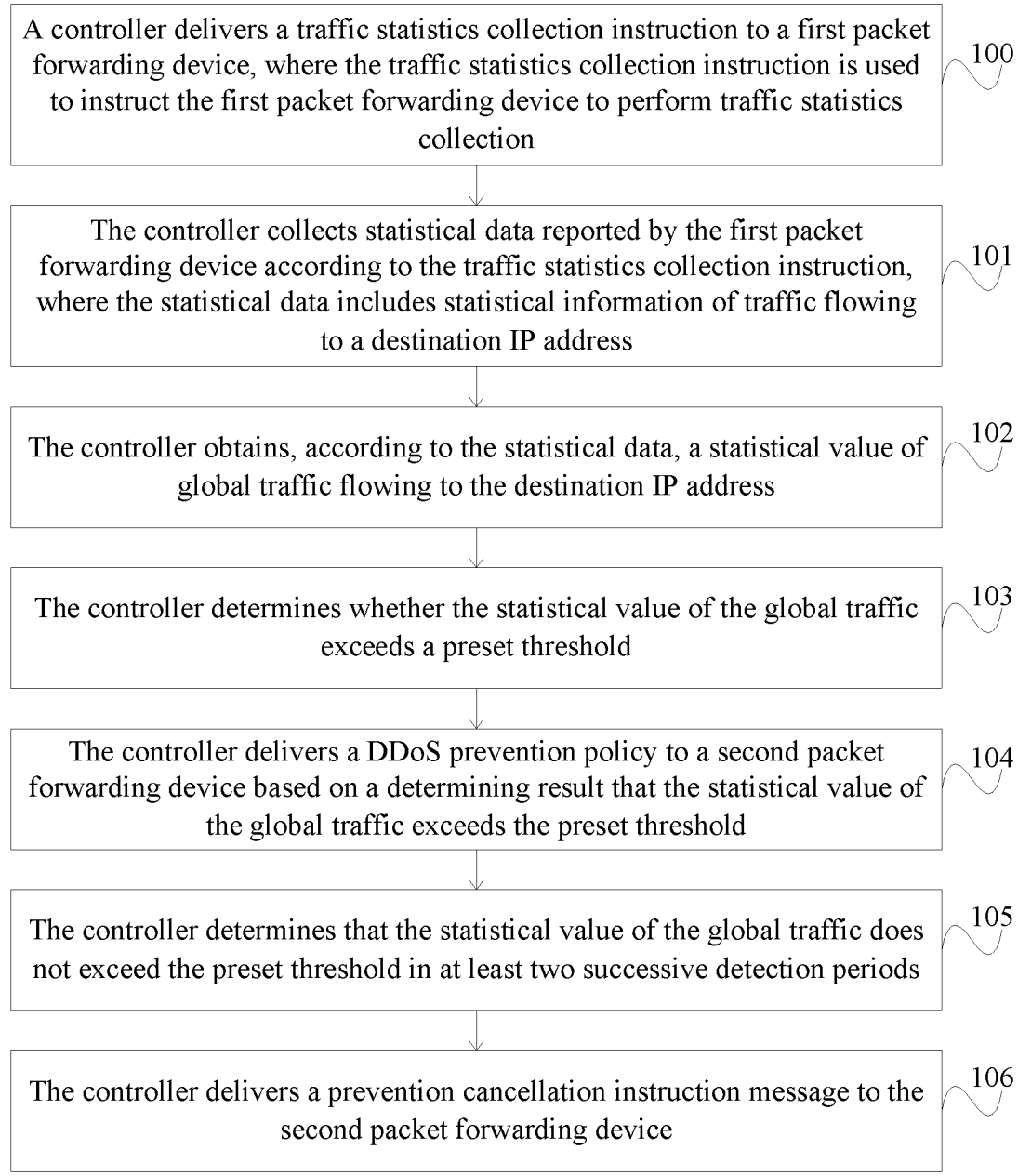
FIG. 11 is a schematic flowchart of another SDN-based DDoS attack prevention method according to an embodiment of the present disclosure.

Further, the controller needs a mechanism used to determine whether a network attack stops. Further, on a basis of FIG. 10, FIG. 11 is a schematic flowchart of another SDN-based DDoS attack prevention method according to this embodiment of the present disclosure. Referring to FIG. 11, after step 104, the method further includes the following steps.

Step 105: The controller determines that the statistical value of the global traffic does not exceed the preset threshold in at least two successive detection periods.

Step 106: The controller delivers a prevention cancellation instruction message to the second packet forwarding device.

The prevention cancellation instruction message is used to instruct the second packet forwarding device to stop executing the DDoS prevention policy.

Figure 12:
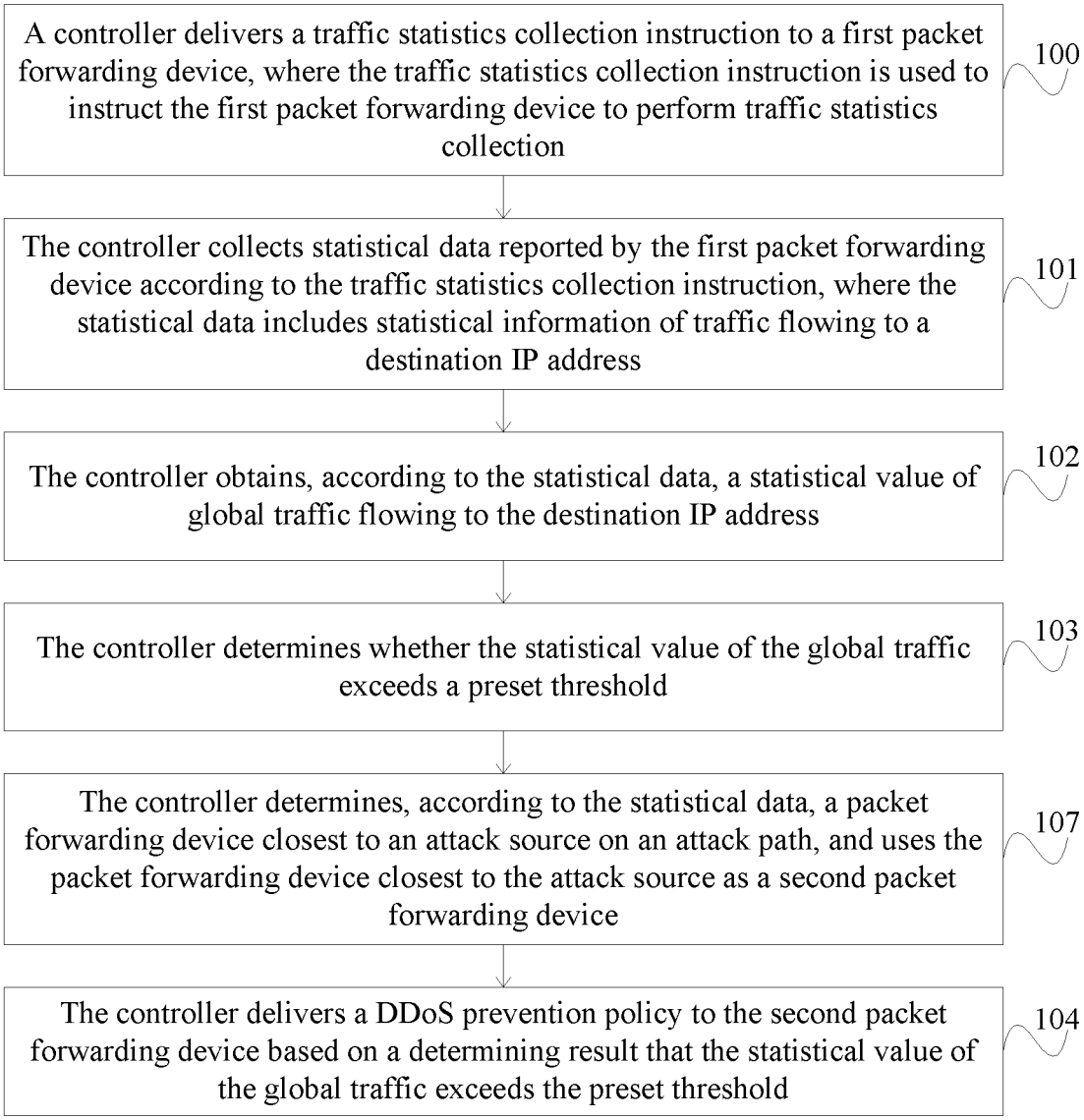
FIG. 12 is a schematic flowchart of another SDN-based DDoS attack prevention method according to an embodiment of the present disclosure.

Optionally, the controller may further deliver the DDoS prevention policy to a packet forwarding device that is close to an attack source and that is located on an SDN edge. Further, on a basis of FIG. 10, FIG. 12 is a schematic flowchart of another SDN-based DDoS attack prevention method according to this embodiment of the present disclosure. Referring to FIG. 12, before step 104, the method further includes the following step.

Step 107: The controller determines, according to the statistical data, a packet forwarding device closest to an attack source on an attack path, and uses the packet forwarding device closest to the attack source as the second packet forwarding device.

Further, the statistical information of the traffic flowing to the destination IP address includes a volume of the traffic flowing from the first packet forwarding device to the destination IP address. A possible implementation of step 107 is as follows.

The controller determines a first attack path according to the volume of the traffic flowing from the first packet forwarding device to the destination IP address.

The first attack path is an attack path, of at least one attack path, with a maximum volume of traffic flowing to the destination IP address.

The controller determines, according to the first attack path, the packet forwarding device closest to the attack source.

The packet forwarding device closest to the attack source is located on an SDN edge that is on the first attack path and that is on a side of a source address of the traffic flowing to the destination IP address.

Figure 13:
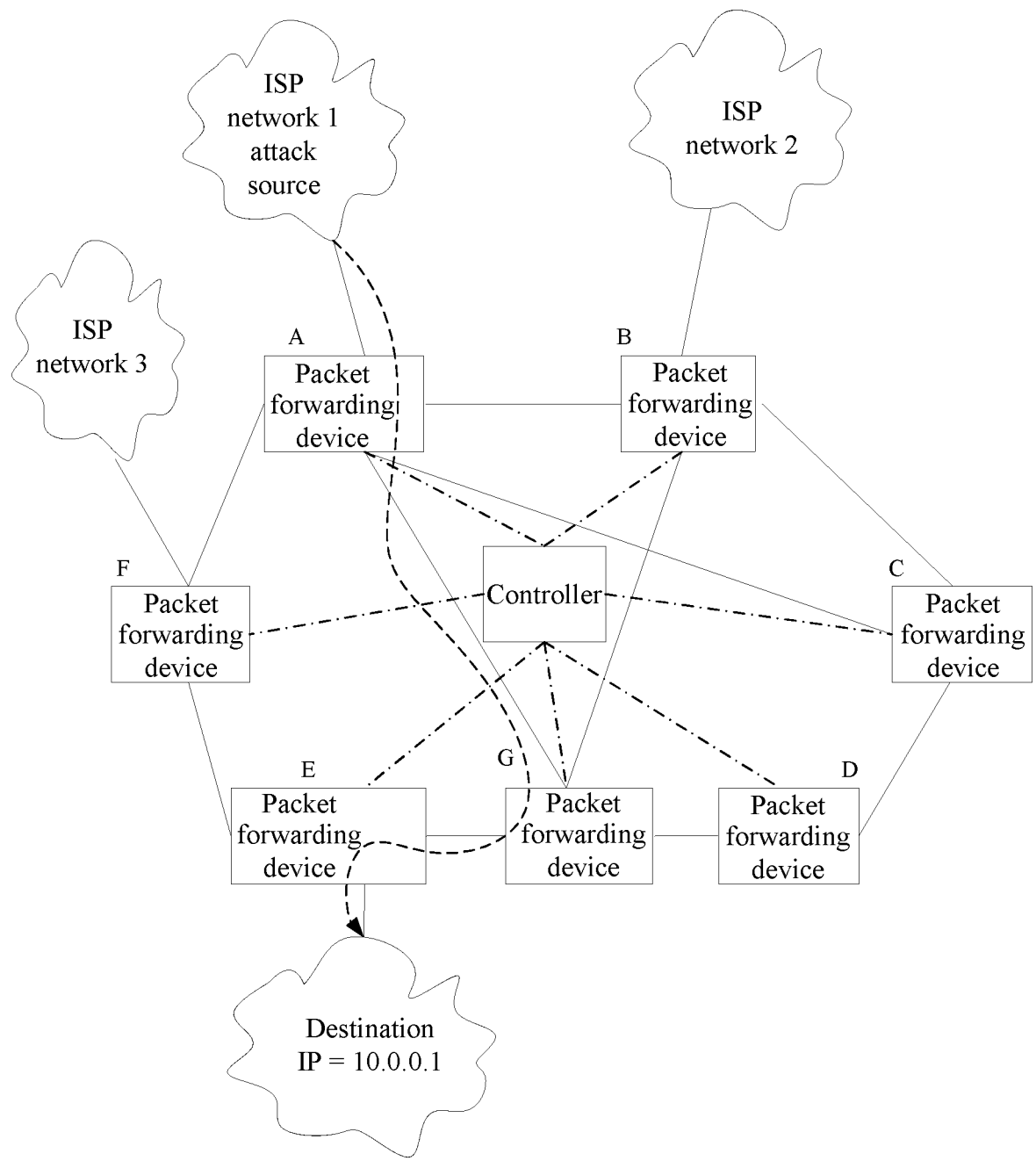
FIG. 13 is a schematic diagram of determining an attack path and a closest attack source.

The following further describes Manner 1 that "the controller determines, according to the statistical data, a packet forwarding device closest to an attack source on an attack path." FIG. 13 is a schematic diagram of determining an attack path and a closest attack source. Referring to FIG. 13, an SDN includes packet forwarding devices A to G, and a controller. The packet forwarding device A is connected to an Internet service provider (ISP) network 1. An attack source of a network attack is in the ISP network 1. The packet forwarding device B is connected to an ISP network 2. The packet forwarding device F is connected to an ISP network 3. The packet forwarding device E is connected to a network to which a destination IP (for example IP=10.0.0.1) belongs. The destination IP is a destination IP address of network attack traffic, that is, an IP address of a victim host. The packet forwarding device A, the packet forwarding device B, the packet forwarding device E, and the packet forwarding device F are used by other networks to access the SDN, and therefore these packet forwarding devices are located on an SDN edge.

Referring to FIG. 13, first, the controller determines, according to an SDN topological relationship, the packet forwarding device E closest to the destination IP address and the foregoing several packet forwarding devices that are located on the SDN edge. In the SDN, there may be multiple paths for the network attack traffic to flow from the attack source to the destination IP address. For example, the traffic path may be: the packet forwarding device A→the packet forwarding device G→the packet forwarding device E, which is briefly referred to as a first attack path hereinafter, the packet forwarding device A→the packet forwarding device F→the packet forwarding device E, which is briefly referred to as a second attack path hereinafter, or the packet forwarding device A→the packet forwarding device B→the packet forwarding device G→the packet forwarding device E, which is briefly referred to as a third attack path hereinafter. The controller collects statistical data of traffic flowing to the destination IP address on each attack path, and the controller sorts the traffic flowing to the destination IP address on each attack path, and determines that the first attack path is an attack path with the largest traffic. Then, the controller determines that the packet forwarding device A is closest to the attack source.

Still referring to FIG. 13, the following describes the first packet forwarding device and the second packet forwarding device. After the controller delivers a traffic statistics collection instruction to the first packet forwarding device, the first packet forwarding device performs traffic statistics collection according to the traffic statistics collection instruction. For the packet forwarding devices in FIG. 13, all of the packet forwarding devices A to G may perform traffic statistics collection, and therefore all of the packet forwarding devices A to G may be used as the first packet forwarding device. Further, after the controller determines that the packet forwarding device A is closest to the attack source, the controller delivers a DDoS prevention policy to the packet forwarding device A, and uses the packet forwarding device A as the second packet forwarding device. Alternatively, the network attack traffic flowing to the destination IP address may pass through the packet forwarding devices A, B, and F separately, and the controller may separately deliver a DDoS prevention policy to the packet forwarding devices A, B, and F, and set the packet forwarding devices A, B, and F as the second packet forwarding device.

Optionally, the DDoS prevention policy includes any one of a black-hole route response policy, a traffic limiting response policy, a rate limiting response policy, a discarding response policy, a local cleaning response policy, or a dynamic diversion and cleaning response policy.

The black-hole route response policy is used to instruct the second packet forwarding device to perform, by configuring a black-hole route, packet discarding processing on the traffic flowing to the destination IP address.

The traffic limiting response policy is used to instruct the second packet forwarding device to perform traffic limiting processing on the traffic flowing to the destination IP address.

The rate limiting response policy is used to instruct the second packet forwarding device to perform rate limiting processing on the traffic flowing to the destination IP address.

The discarding response policy is used to instruct the second packet forwarding device to perform packet discarding processing on the traffic flowing to the destination IP address.

The local cleaning response policy is used to instruct the second packet forwarding device to locally perform cleaning processing on the traffic flowing to the destination IP address.

The dynamic diversion and cleaning response policy is used to instruct the second packet forwarding device to send the traffic flowing to the destination IP address to a cleaning device for cleaning processing.

For the dynamic diversion and cleaning response policy, before the controller delivers the dynamic diversion and cleaning response policy, the controller needs to determine a path with minimum network impact to divert the traffic. The following describes several possible implementations.

Figure 14:
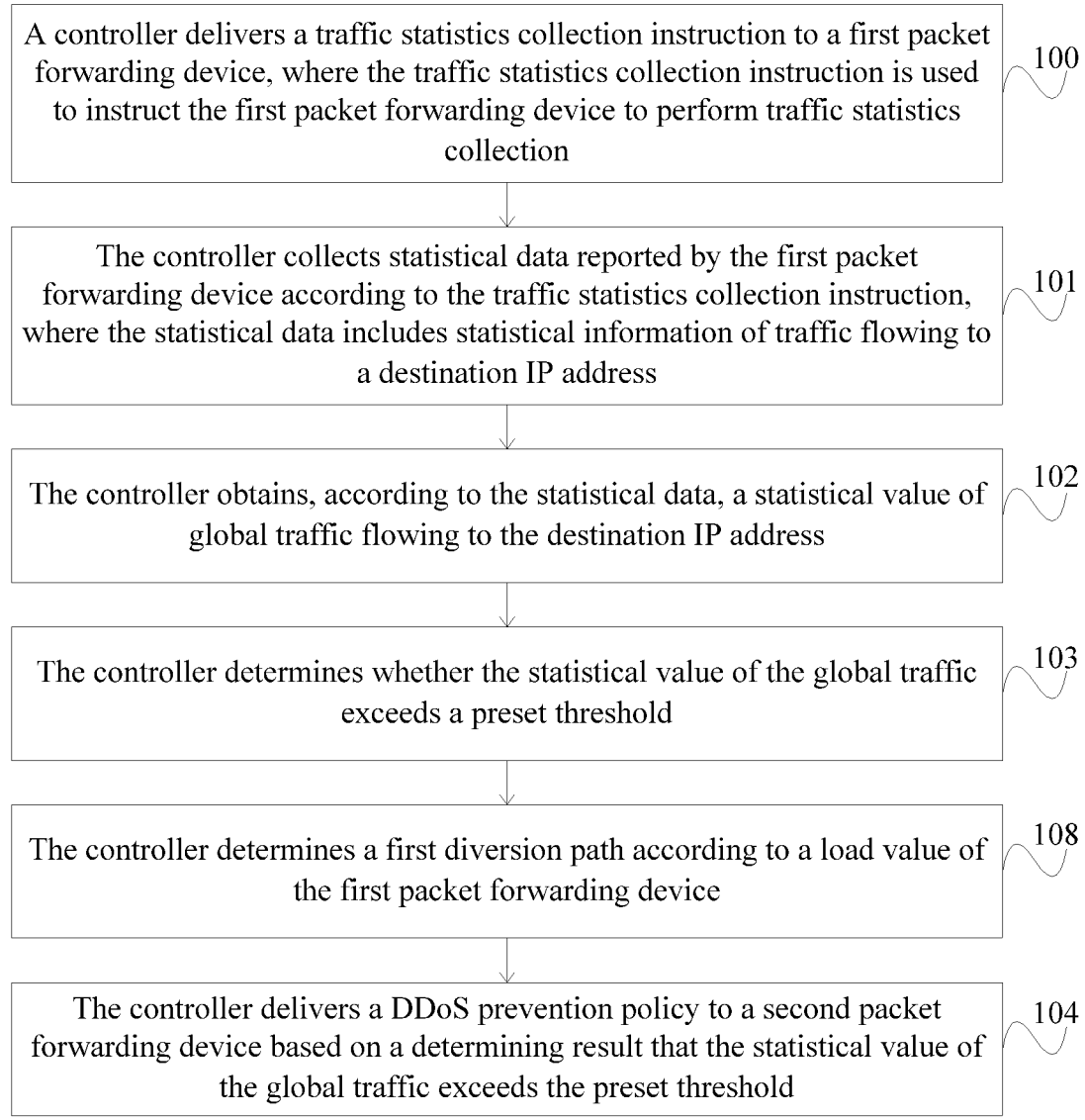
FIG. 14 is a schematic flowchart of another SDN-based DDoS attack prevention method according to an embodiment of the present disclosure.

Manner 1: On a basis of FIG. 10, FIG. 14 is a schematic flowchart of another SDN-based DDoS attack prevention method according to this embodiment of the present disclosure. Referring to FIG. 14, the statistical data further includes a load value of the first packet forwarding device.

Further, before step 104, the method further includes the following step.

Step 108: The controller determines a first diversion path according to the load value of the first packet forwarding device.

The first diversion path is a path with a minimum load between the second packet forwarding device and the cleaning device, and the first diversion path includes the second packet forwarding device and the cleaning device.

The DDoS prevention policy delivered by the controller to the second packet forwarding device is the dynamic diversion and cleaning response policy.

Further, the dynamic diversion and cleaning response policy includes indication information of the first diversion path. The indication information of the first diversion path is used to instruct the second packet forwarding device to send, through the first diversion path, the traffic flowing to the destination IP address to the cleaning device for cleaning processing.

Figure 15:
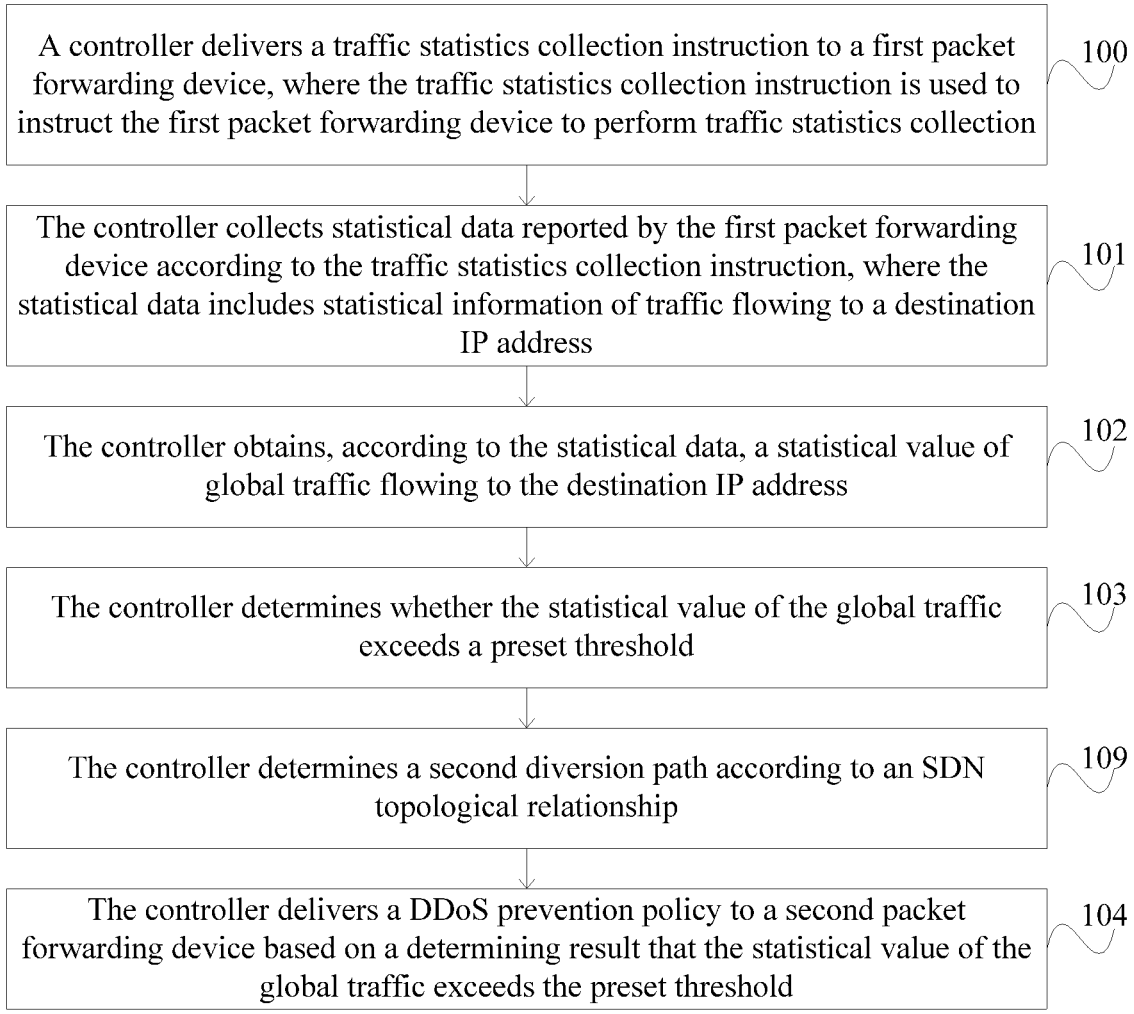
FIG. 15 is a schematic flowchart of another SDN-based DDoS attack prevention method according to an embodiment of the present disclosure.

Manner 2: On a basis of FIG. 10, FIG. 15 is a schematic flowchart of another SDN-based DDoS attack prevention method according to this embodiment of the present disclosure. Referring to FIG. 15, before step 104, the method further includes the following step.

Step 109: The controller determines a second diversion path according to an SDN topological relationship.

Further, the second diversion path is a shortest path between the second packet forwarding device and the cleaning device, and the SDN topological relationship includes a connection relationship between the packet forwarding devices in the SDN and a connection relationship between one or more packet forwarding devices and the cleaning device.

The DDoS prevention policy delivered by the controller to the second packet forwarding device is the dynamic diversion and cleaning response policy.

Further, the dynamic diversion and cleaning response policy includes indication information of the second diversion path. The indication information of the second diversion path is used to instruct the second packet forwarding device to send, through the second diversion path, the traffic flowing to the destination IP address to the cleaning device for cleaning processing.

Referring the FIG. 13, the "first diversion path" in Manner 1 is described. For example, it is assumed that the packet forwarding device F receives the traffic statistics collection instruction sent by the controller. The packet forwarding device F serves as the first packet forwarding device to perform traffic statistics collection, and reports the statistical data to the controller. If the controller delivers the dynamic diversion and cleaning response policy to the packet forwarding device F, the packet forwarding device F serves as the second packet forwarding device to perform the dynamic diversion and cleaning response policy. The packet forwarding device F is connected to the cleaning device. The dynamic diversion and cleaning response policy includes the indication information of the first diversion path, and the indication information of the first diversion path is used to instruct the packet forwarding device F to send, through the first diversion path, the traffic flowing to the destination IP address to the cleaning device for cleaning processing. The packet forwarding device F is directly connected to the cleaning device. Therefore, a diversion path between the packet forwarding device F and the cleaning device is obviously a path with a minimum load between the packet forwarding device F and the cleaning device, and the first diversion path includes the packet forwarding device F and the cleaning device.

For another example, it is assumed that the cleaning device is connected to the packet forwarding device D. If the controller delivers the dynamic diversion and cleaning response policy to the packet forwarding device F, the packet forwarding device F serves as the second packet forwarding device to perform the dynamic diversion and cleaning response policy. In this case, there may be multiple possible diversion paths for diverting traffic from the packet forwarding device F to the cleaning device, for example, F-E-G-D-cleaning device, and F-A-G-D-cleaning device. Different diversion paths have different loads. The controller determines the first diversion path based on the statistical data reported when the packet forwarding device in the foregoing path serves as the first packet forwarding device. For example, if F-E-G-D-cleaning device has the minimum load, the first diversion path includes the packet forwarding devices F, E, G, and D, and the cleaning device.

It should be noted that the steps shown in FIG. 14 and FIG. 15 may be implemented in combination with the steps shown in FIG. 10, or may be implemented in combination with the steps shown in FIG. 11 and FIG. 12.

Corresponding to the foregoing embodiment on a controller side, the following describes the method procedure on a packet forwarding device side.

Figure 16:
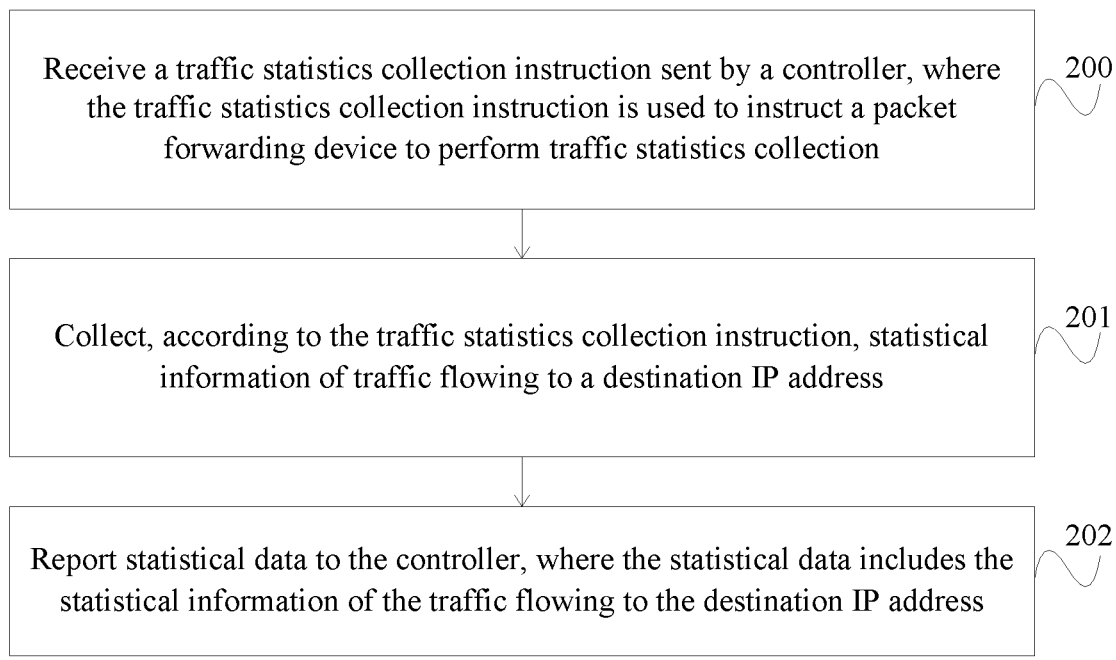
FIG. 16 is a schematic flowchart of another SDN-based DDoS attack prevention method according to an embodiment of the present disclosure.

FIG. 16 is a schematic flowchart of another SDN-based DDoS attack prevention method according to this embodiment of the present disclosure. The method is applied to an SDN system. The SDN system includes a controller and a packet forwarding device. The method is executed by the packet forwarding device. The packet forwarding device may use the structure shown in FIG. 5 or FIG. 8. Referring to FIG. 16, the method includes the following steps.

Step 200: Receive a traffic statistics collection instruction sent by the controller, where the traffic statistics collection instruction is used to instruct the packet forwarding device to perform traffic statistics collection.

The traffic statistics collection instruction carries a destination IP address.

Step 201: Collect, according to the traffic statistics collection instruction, statistical information of traffic flowing to the destination IP address.

Step 202: Report statistical data to the controller, where the statistical data includes the statistical information of the traffic flowing to the destination IP address.

According to the SDN-based DDoS attack prevention method provided in this embodiment of the present disclosure, a packet forwarding device receives a traffic statistics collection instruction sent by a controller. The traffic statistics collection instruction is used to instruct the packet forwarding device to perform traffic statistics collection. The traffic statistics collection instruction carries a destination IP address. The packet forwarding device collects, according to the traffic statistics collection instruction, statistical information of traffic flowing to the destination IP address. The packet forwarding device reports statistical data to the controller. The statistical data includes the statistical information of the traffic flowing to the destination IP address. The packet forwarding device performs the traffic statistics collection on the traffic flowing to the destination IP address, and reports the statistical data to the controller such that the controller can determine, based on the statistical data, whether a DDoS attack occurs, and trigger a corresponding DDoS prevention policy. This reduces impact of a DDoS attack on a network and improves network security.

It should be noted that the packet forwarding device performing the foregoing step 200 to step 202 may be defined as the foregoing first packet forwarding device according to a function of the packet forwarding device.

Optionally, the traffic statistics collection instruction further carries a detection start time.

The detection start time is used to notify the packet forwarding device of a start time of the traffic statistics collection, the traffic statistics collection is continuously performed according to a detection period, and the statistical data is reported to the controller according to the detection period.

Figure 17:
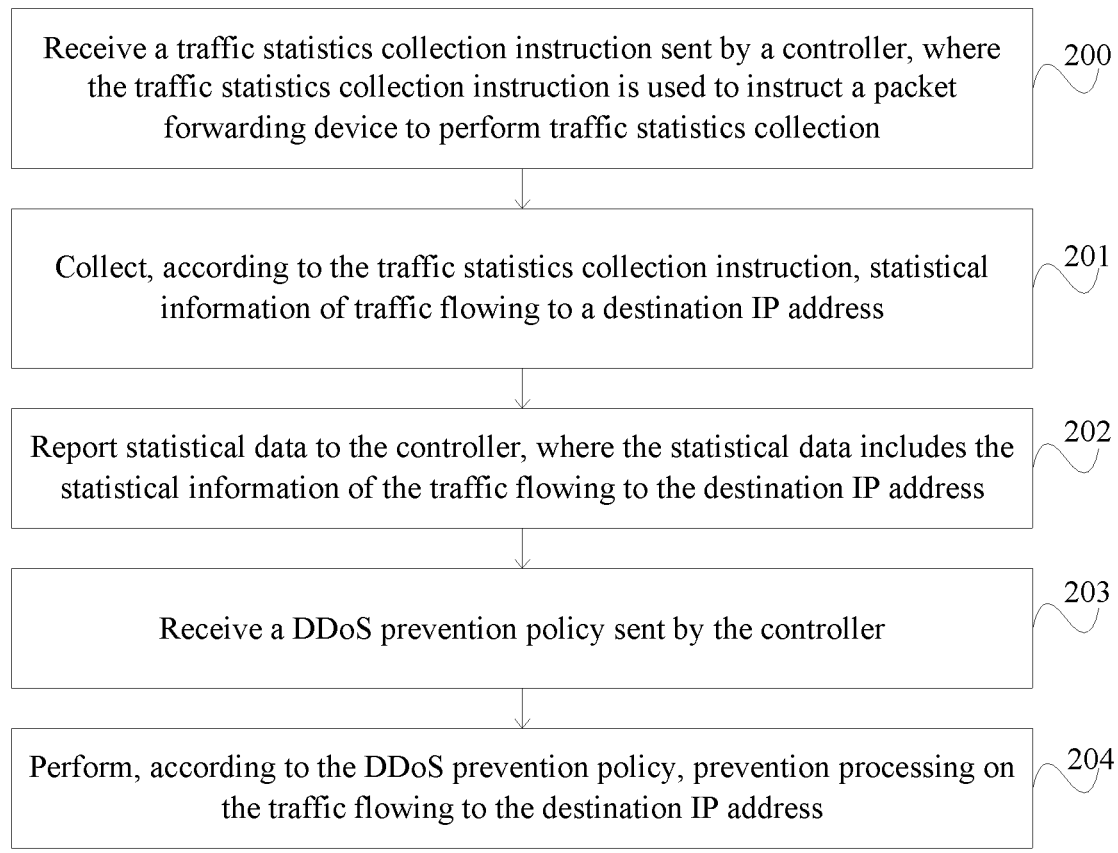
FIG. 17 is a schematic flowchart of another SDN-based DDoS attack prevention method according to an embodiment of the present disclosure.

Further, when the controller executes a mechanism used to determine whether a network attack stops, further, on a basis of FIG. 16, FIG. 17 is a schematic flowchart of another SDN-based DDoS attack prevention method according to this embodiment of the present disclosure. After step 202, the method further includes the following steps.

Step 203: Receive a DDoS prevention policy sent by the controller.

Step 204: Perform, according to the DDoS prevention policy, prevention processing on the traffic flowing to the destination IP address.

Figure 18:
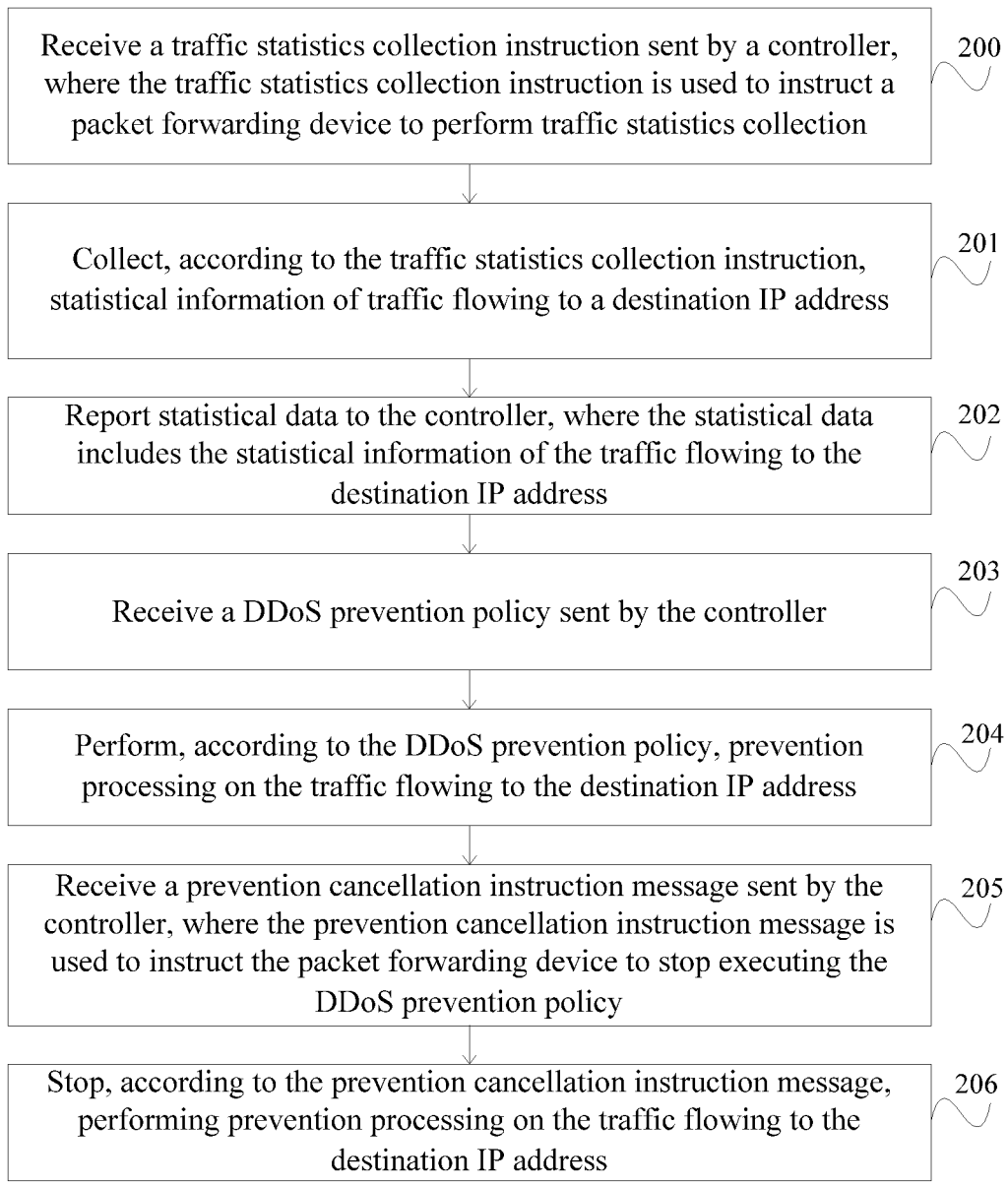
FIG. 18 is a schematic flowchart of another SDN-based DDoS attack prevention method according to an embodiment of the present disclosure.

On a basis of FIG. 17, FIG. 18 is a schematic flowchart of another SDN-based DDoS attack prevention method according to this embodiment of the present disclosure. After step 204, the method further includes the following steps.

Step 205: Receive a prevention cancellation instruction message sent by the controller, where the prevention cancellation instruction message is used to instruct the packet forwarding device to stop executing the DDoS prevention policy.

Step 206: Stop, according to the prevention cancellation instruction message, performing prevention processing on the traffic flowing to the destination IP address.

Optionally, the DDoS prevention policy includes any one of a black-hole route response policy, a traffic limiting response policy, a rate limiting response policy, a discarding response policy, a local cleaning response policy, or a dynamic diversion and cleaning response policy.

The black-hole route response policy is used to instruct the packet forwarding device to perform, by configuring a black-hole route, packet discarding processing on the traffic flowing to the destination IP address.

In this case, a possible implementation of step 204 includes performing, using the black-hole route according to the black-hole route response policy, packet discarding processing on the traffic flowing to the destination IP address.

The traffic limiting response policy is used to instruct the packet forwarding device to perform traffic limiting processing on the traffic flowing to the destination IP address.

In this case, a possible implementation of step 204 includes performing, according to the traffic limiting response policy, traffic limiting processing on the traffic flowing to the destination IP address.

The rate limiting response policy is used to instruct the packet forwarding device to perform rate limiting processing on the traffic flowing to the destination IP address.

In this case, a possible implementation of step 204 includes performing, according to the rate limiting response policy, rate limiting processing on the traffic flowing to the destination IP address.

The discarding response policy is used to instruct the packet forwarding device to perform packet discarding processing on the traffic flowing to the destination IP address.

In this case, a possible implementation of step 204 includes performing, according to the discarding response policy, packet discarding processing on the traffic flowing to the destination IP address.

The local cleaning response policy is used to instruct the packet forwarding device to locally perform cleaning processing on the traffic flowing to the destination IP address.

In this case, a possible implementation of step 204 includes locally performing, according to the local cleaning response policy, cleaning processing on the traffic flowing to the destination IP address.

The dynamic diversion and cleaning response policy is used to instruct the packet forwarding device to send the traffic flowing to the destination IP address to a cleaning device for cleaning processing.

In this case, a possible implementation of step 204 includes sending, according to the dynamic diversion and cleaning response policy, the traffic flowing to the destination IP address to the cleaning device for cleaning processing.

For the dynamic diversion and cleaning response policy, before the controller delivers the dynamic diversion and cleaning response policy, the controller needs to determine a path with minimum network impact to divert the traffic. To implement the solution, on the controller side, in which diversion is performed based on the path with the minimum network impact, the following describes a method procedure that needs to be performed by the packet forwarding device.

Manner 1:

The statistical data further includes a load value of the first packet forwarding device.

The dynamic diversion and cleaning response policy includes indication information of the first diversion path. The indication information of the first diversion path is used to instruct the packet forwarding device to send, through the first diversion path, the traffic flowing to the destination IP address to the cleaning device for cleaning processing. The first diversion path is a path with a minimum load between the packet forwarding device and the cleaning device. The first diversion path includes the second packet forwarding device and the cleaning device.

A possible implementation of step 204 includes sending, through the first diversion path according to the dynamic diversion and cleaning response policy, the traffic flowing to the destination IP address to the cleaning device for cleaning processing.

Manner 2:

The dynamic diversion and cleaning response policy includes indication information of the second diversion path. The indication information of the second diversion path is used to instruct the packet forwarding device to send, through a second diversion path, the traffic flowing to the destination IP address to the cleaning device for cleaning processing. The second diversion path is a shortest path between the packet forwarding device and the cleaning device.

A possible implementation of step 204 includes sending, through the second diversion path according to the dynamic diversion and cleaning response policy, the traffic flowing to the destination IP address to the cleaning device for cleaning processing.

Figure 19:
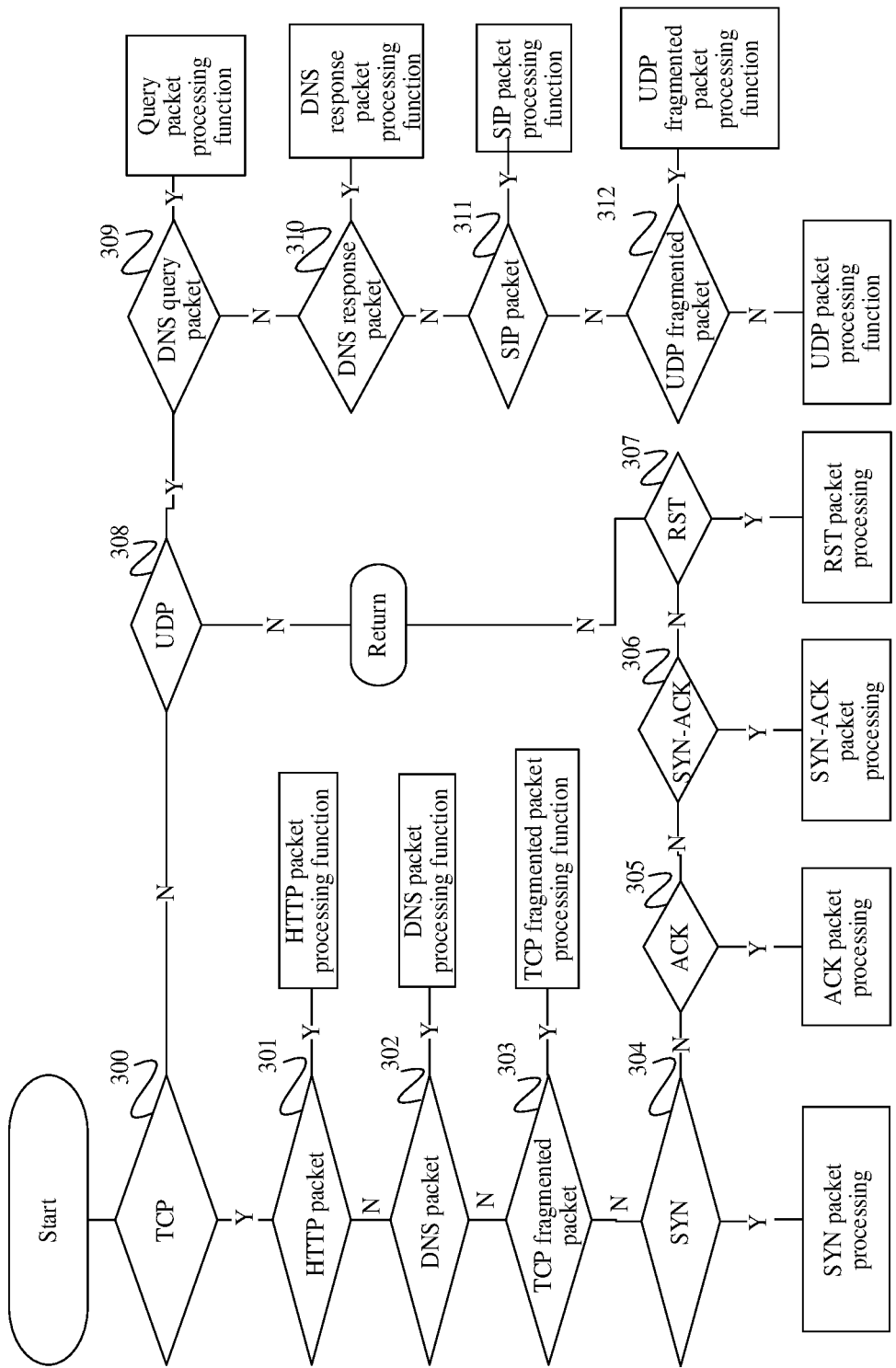
FIG. 19 is a schematic flowchart of local cleaning processing.

The following provides a possible processing manner for a local cleaning instruction. FIG. 19 is a schematic flowchart of local cleaning processing. Referring to FIG. 19, the flowchart includes a processing process for classifying data packets.

Step 300: Determine whether a data packet conforms to the TCP.

If the data packet conforms to the TCP protocol, perform step 301. If the data packet does not conform to the TCP protocol, perform step 308. Further "Yes" designated with "Y" and the "No" designated with "N" in FIG. 19.

Step 301: Determine whether the data packet is a Hyper Text Transfer Protocol (HTTP) packet.

If the data packet is an HTTP packet, use an HTTP packet processing function to perform cleaning processing on the data packet. If the data packet is not an HTTP packet, perform step 302.

Step 302: Determine whether the data packet is a domain name system (DNS) packet.

If the data packet is a DNS packet, use a DNS packet processing function to perform cleaning processing on the data packet. If the data packet is not a DNS packet, perform step 303.

Step 303: Determine whether the data packet is a TCP fragmented packet.

If the data packet is a TCP fragmented packet, use a TCP fragmented packet processing function to perform cleaning processing on the data packet. If the data packet is not a TCP fragmented packet, perform step 304.

Step 304: Determine whether the data packet is a SYN packet.

If the data packet is a SYN packet, use a SYN packet processing function to perform cleaning processing on the data packet. If the data packet is not a SYN packet, perform step 305.

Step 305: Determine whether the data packet is an acknowledgement (ACK) packet.

If the data packet is an ACK packet, use an ACK packet processing function to perform cleaning processing on the data packet. If the data packet is not an ACK packet, perform step 306.

Step 306: Determine whether the data packet is a SYN-ACK packet.

If the data packet is a SYN-ACK packet, use a SYN-ACK packet processing function to perform cleaning processing on the data packet. If the data packet is not a SYN-ACK packet, perform step 307.

Step 307: Determine whether the data packet is a reset (RST) packet.

If the data packet is an RST packet, use a RST packet processing function to perform cleaning processing on the data packet. If the data packet is not an RST packet, return to the previous step.

Step 308: Determine whether the data packet conforms to the UDP protocol.

If the data packet conforms to the UDP protocol, perform step 309. If the data packet does not conform to the UDP protocol, return to the previous step.

Step 309: Determine whether the data packet is a DNS query packet.

If the data packet is a DNS query packet, use a query packet processing function to perform cleaning processing on the data packet. If the data packet is not a DNS query packet, perform step 310.

Step 310: Determine whether the data packet is a DNS response packet.

If the data packet is a DNS response packet, use a DNS response packet processing function to perform cleaning processing on the data packet. If the data packet is not a DNS response packet, perform step 311.

Step 311: Determine whether the data packet is a Session Initiation Protocol (SIP) packet.

If the data packet is a SIP packet, use a SIP packet processing function to perform cleaning processing on the data packet. If the data packet is not a SIP packet, perform step 312.

Step 312: Determine whether the data packet is a UDP fragmented packet.

If the data packet is a UDP fragmented packet, use a UDP fragmented packet processing function to perform cleaning processing on the data packet. Otherwise, a UDP packet processing function is used to perform cleaning processing on the data packet.

It should be noted that the solution shown in FIG. 19 is only one possible implementation solution. Another processing procedure that can implement local cleaning is not limited in this embodiment.

It should be noted that the packet forwarding device performing foregoing step 203 to step 206 may be defined as the foregoing second packet forwarding device according to a function of the packet forwarding device.

Figure 20:
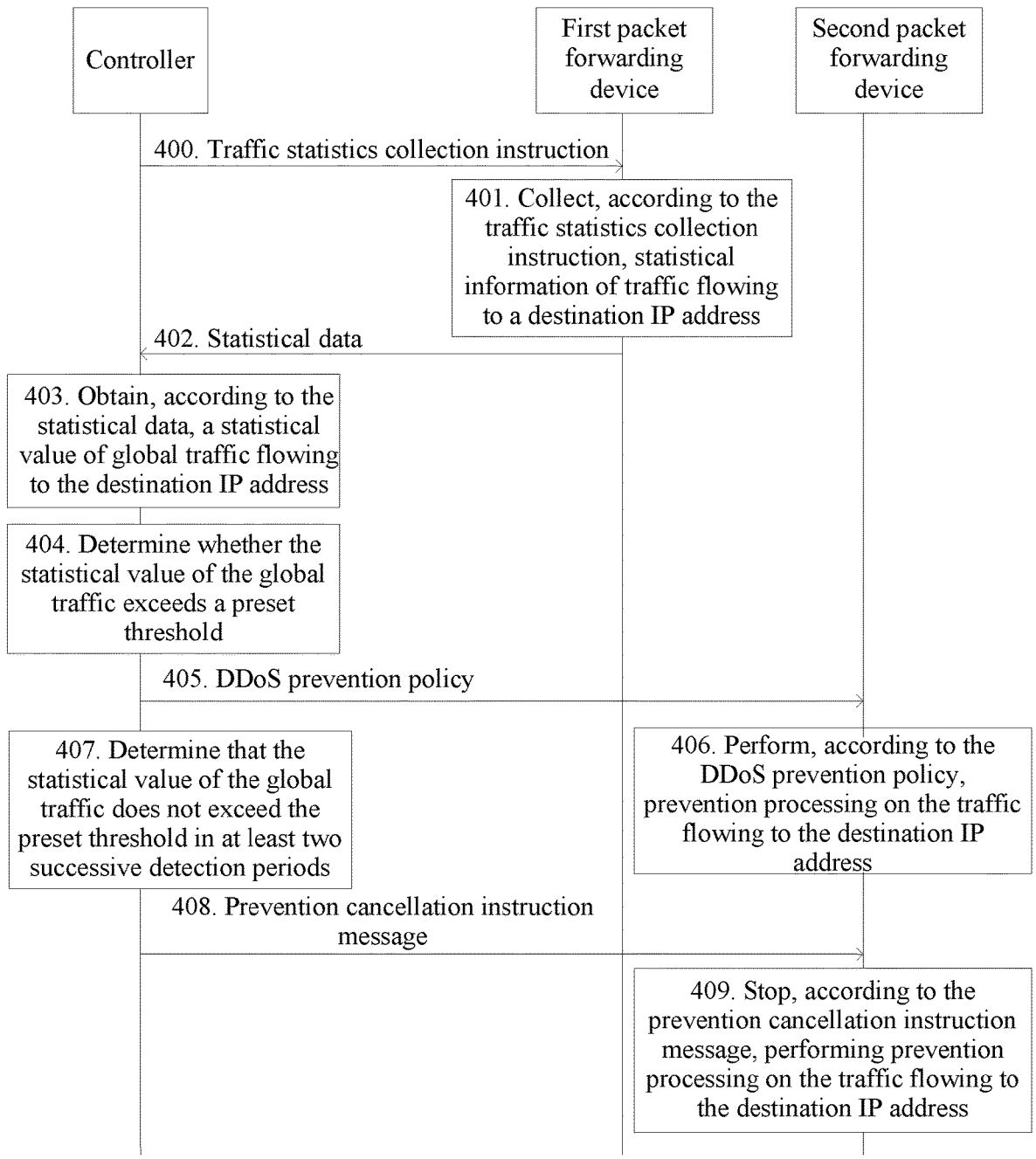
FIG. 20 is a schematic diagram of an interaction procedure of an SDN-based DDoS attack prevention method according to an embodiment of the present disclosure.

For the procedure performed by the controller in the embodiment corresponding to FIG. 10 to FIG. 15 and the procedure performed by the packet forwarding device in the embodiment corresponding to FIG. 16 to FIG. 19, the following uses a specific embodiment to describe interaction between the controller and the packet forwarding device. FIG. 20 is a schematic diagram of an interaction procedure of an SDN-based DDoS attack prevention method according to an embodiment of the present disclosure. Referring to FIG. 20, the interaction procedure includes the following steps.

Step 400: The controller delivers a traffic statistics collection instruction to a first packet forwarding device.

Step 401: The first packet forwarding device collects, according to the traffic statistics collection instruction, statistical information of traffic flowing to a destination IP address.

Step 402: The controller receives statistical data sent by the first packet forwarding device.

Step 403: The controller obtains, according to the statistical data, a statistical value of global traffic flowing to the destination IP address.

Step 404: The controller determines whether the statistical value of the global traffic exceeds a preset threshold.

Step 405: The controller delivers a DDoS prevention policy to a second packet forwarding device based on a determining result that the statistical value of the global traffic exceeds the preset threshold.

Step 406: The second packet forwarding device performs, according to the DDoS prevention policy, prevention processing on the traffic flowing to the destination IP address.

Step 407: The controller determines that the statistical value of the global traffic does not exceed the preset threshold in at least two successive detection periods.

Step 408: The controller delivers a prevention cancellation instruction message to the second packet forwarding device.

Step 409: The second packet forwarding device stops, according to the prevention cancellation instruction message, performing prevention processing on the traffic flowing to the destination IP address.

Figure 21:
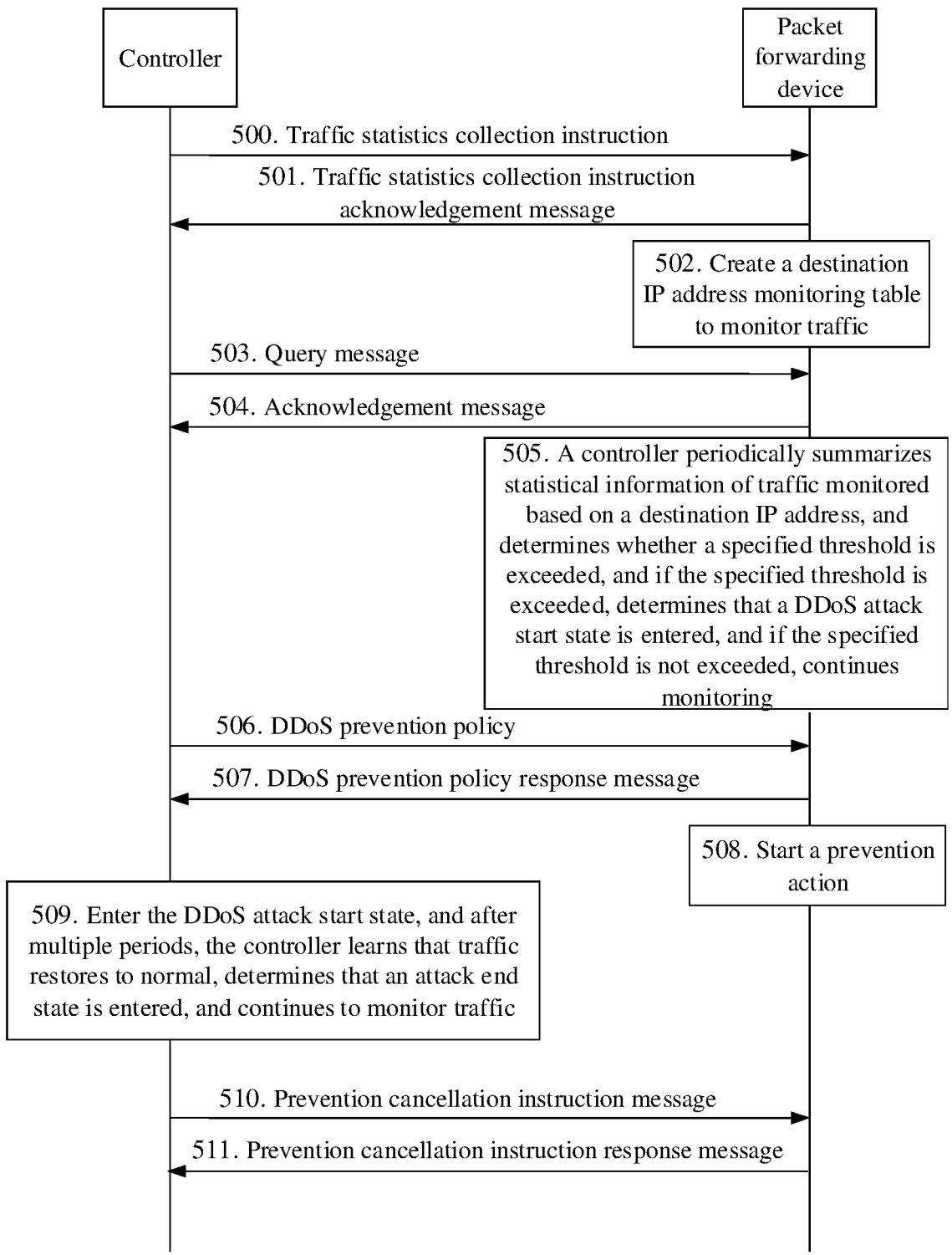
FIG. 21 is a schematic diagram of interaction in another SDN-based DDoS attack prevention method according to an embodiment of the present disclosure.

The following uses a specific embodiment to describe interaction between a controller and a packet forwarding device. FIG. 21 is a schematic diagram of interaction in another SDN-based DDoS attack prevention method according to an embodiment of the present disclosure. Referring to FIG. 21, the interaction includes the following steps.

Step 500: The controller delivers a traffic statistics collection instruction to the packet forwarding device.

Step 501: The packet forwarding device sends a traffic statistics collection instruction acknowledgement message to the controller.

Step 502: The packet forwarding device creates a destination IP address monitoring table to monitor traffic.

Step 503: The controller periodically delivers a query message.

It should be noted that step 503 may alternatively be: The packet forwarding device periodically and proactively reports statistical data.

Step 504: The packet forwarding device sends an acknowledgement message to the controller. The acknowledge message includes statistical data.

Step 505: The controller periodically summarizes statistical information of traffic monitored based on a destination IP address, and determines whether a specified threshold is exceeded, and if the specified threshold is exceeded, determines that a DDoS attack start state is entered, and if the specified threshold is not exceeded, continues monitoring.

Enter the DDoS attack start state, and the controller finds, according to a monitoring result, a packet forwarding device that is closest to an attack source.

Step 506: The controller delivers a DDoS prevention policy.

Step 507: The packet forwarding device sends a DDoS prevention policy response message to the controller.

Step 508: The packet forwarding device starts a prevention action.

Step 509: Enter the DDoS attack start state, and after multiple periods, the controller learns that traffic restores to normal, determines that an attack end state is entered, and continues to monitor traffic.

Enter the attack end state.

Step 510: The controller delivers a prevention cancellation instruction message to the packet forwarding device that makes a response.

Step 511: The packet forwarding device sends a prevention cancellation instruction response message to the controller.

The following provides a specific implementation for a message, signaling, and an information element in the interaction in FIG. 20 or FIG. 21.

ulRstBand), an error packet rate (ULONG ulErrPktRate), error packet bandwidth (ULONG ulErrB and), a fragmented packet rate (ULONG ulFragPktRate), fragmented packet bandwidth (ULONG ulFragBand), an HTTP GET packet rate (ULONG ulHttpGetPktRate), HTTP GET packet bandwidth (ULONG ulHttpGetBand), a DNS packet rate (ULONG ulDnsByteNum), DNS packet bandwidth (ULONG ulDnsB and), and a quantity of flows (ULONG ulFlowCnt).

In addition, the foregoing statistical data further includes a load value of the first packet forwarding device. Further, an implementation of the load value of the first packet forwarding device may be a throughput of the first packet forwarding device, or bandwidth usage of the first packet forwarding device, or the like. Further, the load value of the first packet forwarding device may be set in a field in the statistical information of the traffic, or may be set in an idle field in the statistical data.

The following provides a possible implementation of a message exchanged between the controller and the packet forwarding device The controller sends a traffic statistics collection instruction to the packet forwarding device. Correspondingly, the packet forwarding device sends a traffic statistics collection instruction acknowledgement message to the controller. Based on the OPENFLOW protocol, these exchanged messages may be in the following data structure:

```
struct ofp_ddos_config {
struct ofp_header header; /* Type OFPT_ROLE_REQUEST/OFPT_ROLE_REPLY.
*/
uint32_t dstip[4];     /*destination IP address*/
uint32_t netoff[4];    /*subnet mask*/
uint64_t stat_ctrl;    /*statistics collection enablement, enabled or disabled*/
uint64_t stat_tics;    /* statistical period, seconds*/
uint64_t stat_fun;     /* statistics collection sub-function switch, enabled by bit*/
};
```

The packet forwarding device creates the destination IP address monitoring table (ddos-group table) that is based on the foregoing destination IP address. The table is a hash table. If in an establishment algorithm, a specified destination IP address is used to hit a destination IP address of a traffic data packet, it is considered that the table is hit, and the packet forwarding device may perform traffic statistics collection.

In a possible implementation of the statistical information of the traffic flowing to the destination IP address, fields included in the statistical information of the traffic may include the information of a total quantity of packets (ULONG ulPacketSum), a total quantity of bytes (ULONG ulByteSum), a packet rate (ULONG ulICMPPktRate), ICMP bandwidth (ULONG ulICMPB and), a TCP packet rate (ULONG ulTcpPktRate), TCP bandwidth (ULONG ulTcpB and), a UDP packet rate (ULONG ulUdpPktRate), and UDP bandwidth (ULONG ulUdpB and).

Optionally, for all types of TCP packets, a field included in the statistical information of the traffic may include at least one type of the following information: a SYN packet rate (ULONG ulSynPktRate), SYN packet bandwidth (ULONG ulSynB and), an ACK packet rate (ULONG ulAckPktRate), ACK packet bandwidth (ULONG ulAckBand), a SYN/ACK packet rate (ULONG ulSynAckPktRate), SYN/ACK packet bandwidth (ULONG ulSynAckBand), a FIN packet rate (ULONG ulFinPktRate), FIN packet bandwidth (ULONG ulFinBand), an RST packet rate (ULONG ulRstPktRate), RST packet bandwidth (ULONG Further, the exchanged messages using the data structure may carry a message type field (Type OFPT_ROLE_REQUEST/OFPT_ROLE_REPLY), destination IP address field, subnet mask field, statistics collection enablement field, statistical period field, and statistics collection sub-function switch field.

The destination IP address field occupies four bytes. The subnet mask field occupies four bytes. The statistics collection enablement field occupies eight bytes, and is used to instruct to enable traffic statistics collection or disable traffic statistics collection. The statistical period field occupies eight bytes, and is used to indicate a traffic statistics collection period, a time unit of the statistical period field may be seconds or another time unit meeting an SDN requirement. The statistics collection sub-function switch field occupies eight bytes, and is used to instruct to enable or disable, by bit, a function related to traffic statistics collection.

The controller collects statistical data reported by the packet forwarding device according to the traffic statistics collection instruction. Further, the controller may send a query message to the packet forwarding device, and receive an acknowledgement message sent by the packet forwarding device. The acknowledgement message includes the statistical data. Based on the OPENFLOW protocol, the query message and the acknowledgement message may be in the following data structure:

```
struct ofp_ddos_report {
    struct              ofp_header         header;         /*Type
OFPT_ROLE_REQUEST/OFPT_ROLE_REPLY.*/
    uint32_t dstip[4];    /*destination IP address*/
    uint32_t netoff[4];   /*subnet mask*/
    uint64_t stat_tics;   /* statistical period, seconds */
    uint32_t stat_times;      /*quantity of periods that have been counted and reported up
to now*/
    struct ofp_ddos_stat statdata; /* summarization of statistical information of traffic*/
};
```

Further, the query message and the acknowledgement message that use the data structure carry a message type field (Type OFPT_ROLE_REQUEST/OFPT_ROLE_REPLY), destination IP address field, subnet mask field, statistical period field, field of quantity of periods that have been counted and reported up to now, and summarization field of statistical information of traffic.

The destination IP address field occupies four bytes. The subnet mask field occupies four bytes. The statistical period field occupies eight bytes, and is used to indicate a traffic statistics collection period, a time unit of the statistical period field may be seconds or another time unit meeting an SDN requirement. The field of the quantity of periods that have been counted and reported up to now occupies four bytes. The summarization of the statistical information of the traffic includes statistical items included in the packet forwarding device, and each statistical item is included in the data structure in forms of a statistics variable name and a statistical variable value.

After determining that a network attack occurs, the controller delivers a DDoS prevention policy to the packet forwarding device, the packet forwarding device sends a DDoS prevention policy response message to the controller. After the network attack stops, the controller delivers a prevention cancellation instruction message to the packet forwarding device, and the packet forwarding device sends a prevention cancellation instruction response message to the controller. Based on the OPENFLOW protocol, these exchanged messages may be in the following data structure:

```
struct ofp_ddos_action{
    struct              ofp_header         header;         /*Type
OFPT_ROLE_REQUEST/OFPT_ROLE_REPLY.*/
    uint32_t dstip[4];        /*destination IP address*/
    uint32_t netoff[4];       /*subnet mask*/
    uint64_t action_flag;     /*action enablement, enabled or disabled*/
    uint64_t action_type;     /*response action type*/
    struct ofp_ddos_action_param actionparam; /*response action parameter set*/
};
```

Further, the exchanged messages using the data structure carry a message type field (Type OFPT_ROLE_REQUEST/OFPT_ROLE_REPLY), a destination IP address field, a subnet mask field, action enablement field, a response action type field, and a response action parameter set field.

The destination IP address field occupies four bytes. The subnet mask field occupies four bytes. The action enablement field occupies eight bytes, and is used to indicate that an action is in an "enabled" or "disabled" state. The response action type field occupies eight bytes, and includes blackhole route, traffic limiting (rate limiting), discarding, local cleaning, and diversion and cleaning. The response action parameter set includes a parameter related to a specific response action.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A software defined networking (SDN)-based distributed denial of service (DDoS) attack prevention method comprising:
   delivering, by a controller, a traffic statistics collection instruction to a first packet forwarding device, wherein the traffic statistics collection instruction instructs the first packet forwarding device to perform traffic statistics collection based on a destination Internet Protocol (IP) address, and wherein the traffic statistics collection instruction carries the destination IP address;
   collecting, by the controller, statistical data reported by the first packet forwarding device according to the traffic statistics collection instruction, wherein the statistical data comprises statistical information of traffic flowing to the destination IP address;
   obtaining, by the controller according to the statistical data, a statistical value of global traffic flowing to the destination IP address, wherein the statistical value of the global traffic reflects traffic flowing to the destination IP address within a range of an SDN system and is obtained after the controller summarizes statistical data reported by at least two packet forwarding devices comprising the first packet forwarding device;
   determining, by the controller, whether the statistical value of the global traffic exceeds a preset threshold; and delivering, by the controller, a DDoS prevention policy to a second packet forwarding device when the statistical value of the global traffic exceeds the preset threshold.

2. The SDN-based DDoS attack prevention method of claim 1, wherein the traffic statistics collection instruction further carries a detection start time, wherein the detection start time notifies the first packet forwarding device of a start time of the traffic statistics collection, wherein the traffic statistics collection is continuously performed by the first packet forwarding device according to a detection period, and wherein the statistical data is reported by the first packet forwarding device to the controller according to the detection period.

3. The SDN-based DDoS attack prevention method of claim 2, further comprising:
determining, by the controller, that the statistical value of the global traffic does not exceed the preset threshold in at least two successive detection periods; and
delivering, by the controller, a prevention cancellation instruction message to the second packet forwarding device,
wherein the prevention cancellation instruction message instructs the second packet forwarding device to stop executing the DDoS prevention policy.

4. The SDN-based DDoS attack prevention method of claim 1, wherein before delivering the DDoS prevention policy to the second packet forwarding device, the SDN-based DDoS attack prevention method further comprises:
determining, by the controller according to the statistical data, a packet forwarding device closest to an attack source on an attack path; and
setting, by the controller, the packet forwarding device closest to the attack source as the second packet forwarding device.

5. The SDN-based DDoS attack prevention method of claim 4, wherein the statistical information comprises a volume of traffic flowing from the first packet forwarding device to the destination IP address, and wherein determining the packet forwarding device comprises:
determining, by the controller, a first attack path according to the volume of the traffic flowing from the first packet forwarding device to the destination IP address, wherein the first attack path is an attack path, of at least one attack path, with a maximum volume of the traffic flowing to the destination IP address; and
determining, by the controller according to the first attack path, the packet forwarding device closest to the attack source, wherein the packet forwarding device closest to the attack source is located on an SDN edge on the first attack path and on a side of a source address of the traffic flowing to the destination IP address.

6. The SDN-based DDoS attack prevention method of claim 1, wherein the DDoS prevention policy comprises any one of the following response policies:
a black-hole route response policy instructing the second packet forwarding device to perform, by configuring a black-hole route, packet discarding process on the traffic flowing to the destination IP address;
a traffic limiting response policy instructing the second packet forwarding device to perform traffic limiting process on the traffic flowing to the destination IP address;
a rate limiting response policy instructing the second packet forwarding device to perform rate limiting process on the traffic flowing to the destination IP address;
a discarding response policy instructing the second packet forwarding device to perform the packet discarding process on the traffic flowing to the destination IP address;
a local cleaning response policy instructing the second packet forwarding device to locally perform cleaning process on the traffic flowing to the destination IP address; or
a dynamic diversion and cleaning response policy instructing the second packet forwarding device to send the traffic flowing to the destination IP address to a cleaning device for the cleaning process.

7. The SDN-based DDoS attack prevention method of claim 6, wherein the statistical data further comprises a load value of the first packet forwarding device, wherein before the controller delivers the DDoS prevention policy to the second packet forwarding device, the SDN-based DDoS attack prevention method further comprises determining, by the controller, a first diversion path according to the load value of the first packet forwarding device, wherein the first diversion path is a path with a minimum load between the second packet forwarding device and the cleaning device, wherein the first diversion path comprises the second packet forwarding device and the cleaning device, wherein the DDoS prevention policy delivered by the controller to the second packet forwarding device is the dynamic diversion and cleaning response policy, wherein the dynamic diversion and cleaning response policy comprises indication information of the first diversion path, and wherein the indication information of the first diversion path instructs the second packet forwarding device to send, through the first diversion path, the traffic flowing to the destination IP address to the cleaning device for the cleaning process.

8. The SDN-based DDoS attack prevention method of claim 6, wherein before the controller delivers the DDoS prevention policy to the second packet forwarding device, the SDN-based DDoS attack prevention method comprises determining, by the controller, a second diversion path according to an SDN topological relationship, wherein the second diversion path is a shortest path between the second packet forwarding device and the cleaning device, wherein the SDN topological relationship comprises a connection relationship between packet forwarding devices in the SDN system and a connection relationship between one or more packet forwarding devices and the cleaning device, wherein the DDoS prevention policy delivered by the controller to the second packet forwarding device is the dynamic diversion and cleaning response policy, wherein the dynamic diversion and cleaning response policy comprises indication information of the second diversion path, and wherein the indication information of the second diversion path instructs the second packet forwarding device to send, through the second diversion path, the traffic flowing to the destination IP address to the cleaning device for the cleaning process.

9. A software defined networking (SDN)-based distributed denial of service (DDoS) attack prevention method, applied to an SDN system comprising a controller and a packet forwarding device, wherein the SDN-based DDoS attack prevention method is executed by the packet forwarding device, and wherein the SDN-based DDoS attack prevention method comprises:
receiving a traffic statistics collection instruction from the controller, wherein the traffic statistics collection instruction instructs the packet forwarding device to perform traffic statistics collection, and wherein the traffic statistics collection instruction carries a destination Internet Protocol (IP) address;

collecting, according to the traffic statistics collection instruction, statistical information of traffic flowing to the destination IP address;

reporting statistical data to the controller, wherein the statistical data comprises the statistical information of the traffic flowing to the destination IP address;

receiving a DDoS prevention policy from the controller after reporting the statistical data to the controller; and performing prevention processing on the traffic flowing to the destination IP address according to the DDoS prevention policy, wherein the DDoS prevention policy comprises any one of the following response policies:

a black-hole route response policy instructing the packet forwarding device to perform, by configuring a black-hole route, packet discarding process on the traffic flowing to the destination IP address, wherein performing the prevention processing on the traffic flowing to the destination IP address comprises performing, using the black-hole route according to the black-hole route response policy, the packet discarding process on the traffic flowing to the destination IP address;

a traffic limiting response policy instructing the packet forwarding device to perform traffic limiting process on the traffic flowing to the destination IP address, wherein performing the prevention processing on the traffic flowing to the destination IP address comprises performing, according to the traffic limiting response policy, the traffic limiting process on the traffic flowing to the destination IP address;

a rate limiting response policy instructing the packet forwarding device to perform rate limiting process on the traffic flowing to the destination IP address, wherein performing the prevention processing on the traffic flowing to the destination IP address comprises performing, according to the rate limiting response policy, the rate limiting process on the traffic flowing to the destination IP address;

a discarding response policy instructing the packet forwarding device to perform the packet discarding process on the traffic flowing to the destination IP address, wherein performing the prevention processing on the traffic flowing to the destination IP address comprises performing, according to the discarding response policy, the packet discarding process on the traffic flowing to the destination IP address;

a local cleaning response policy instructing the packet forwarding device to locally perform cleaning process on the traffic flowing to the destination IP address, wherein performing the prevention processing on the traffic flowing to the destination IP address comprises locally performing, according to the local cleaning response policy, the cleaning process on the traffic flowing to the destination IP address; or a dynamic diversion and cleaning response policy instructing the packet forwarding device to send the traffic flowing to the destination IP address to a cleaning device for the cleaning process, wherein performing the prevention processing on the traffic flowing to the destination IP address comprises sending, according to the dynamic diversion and cleaning response policy, the traffic flowing to the destination IP address to the cleaning device for the cleaning process.

10. The SDN-based DDoS attack prevention method of claim 9, wherein the traffic statistics collection instruction further carries a detection start time, wherein the detection start time notifies the packet forwarding device of a start time of the traffic statistics collection, wherein the traffic statistics collection is continuously performed according to a detection period, and wherein the statistical data is reported to the controller according to the detection period.

11. The SDN-based DDoS attack prevention method of claim 9, wherein after receiving the DDoS prevention policy from the controller, the SDN-based DDoS attack prevention method further comprises receiving a prevention cancellation instruction message from the controller, wherein the prevention cancellation instruction message instructs the packet forwarding device to stop executing the DDoS prevention policy.

12. The SDN-based DDoS attack prevention method of claim 11, wherein after receiving the DDoS prevention policy from the controller, the SDN-based DDoS attack prevention method further comprises stopping performing the prevention processing on the traffic flowing to the destination IP address according to the prevention cancellation instruction message.

13. The SDN-based DDoS attack prevention method of claim 9, wherein the DDoS prevention policy is the dynamic diversion and cleaning response policy, wherein the dynamic diversion and cleaning response policy comprises indication information of a second diversion path, wherein the indication information of the second diversion path instructs the packet forwarding device to send, through the second diversion path, the traffic flowing to the destination IP address to the cleaning device for the cleaning process, wherein the second diversion path is a shortest path between the packet forwarding device and the cleaning device, and wherein sending the traffic flowing to the destination IP address to the cleaning device for the cleaning process comprises sending, through the second diversion path according to the dynamic diversion and cleaning response policy, the traffic flowing to the destination IP address to the cleaning device for the cleaning process.

14. A controller comprising:

a transceiver configured to:

deliver a traffic statistics collection instruction to a first packet forwarding device, wherein the traffic statistics collection instruction instructs the first packet forwarding device to perform traffic statistics collection based on a destination Internet Protocol (IP) address, and wherein the traffic statistics collection instruction carries the destination IP address; and collect statistical data reported by the first packet forwarding device according to the traffic statistics collection instruction from the transceiver, wherein the statistical data comprises statistical information of traffic flowing to the destination IP address;

one or more processors coupled to the transceiver and configured to:

obtain, according to the statistical data received by the transceiver, a statistical value of global traffic flowing to the destination IP address, wherein the statistical value of the global traffic reflects traffic flowing to the destination IP address within a range of a software defined networking (SDN) system and is obtained after the controller summarizes statistical data reported by at least two packet forwarding devices comprising the first packet forwarding device; and determine whether the statistical value of the global traffic exceeds a preset threshold, wherein the transceiver is further configured to deliver a distributed denial of service (DDoS) prevention policy to a second packet forwarding device when the statistical value of the global traffic exceeds the preset threshold.

15. The controller of claim 14, wherein the traffic statistics collection instruction further carries a detection start time, wherein the detection start time notifies the first packet forwarding device of a start time of the traffic statistics collection, wherein the traffic statistics collection is continuously performed by the first packet forwarding device according to a detection period, wherein the statistical data is reported by the first packet forwarding device to the controller according to the detection period, wherein the one or more processors are further configured to determine that the statistical value of the global traffic does not exceed the preset threshold in at least two successive detection periods, wherein the transceiver is further configured to deliver a prevention cancellation instruction message to the second packet forwarding device when the statistical value of the global traffic does not exceed the preset threshold in the at least two successive detection periods, and wherein the prevention cancellation instruction message instructs the second packet forwarding device to stop executing the DDoS prevention policy.

16. The controller of claim 14, wherein before delivering the DDoS prevention policy to the second packet forwarding device, the one or more processors are further configured to determine, according to the statistical data received by the transceiver, a packet forwarding device closest to an attack source on an attack path.

17. The controller of claim 16, wherein before delivering the DDoS prevention policy to the second packet forwarding device, the one or more processors are further configured to set the packet forwarding device closest to the attack source as the second packet forwarding device.

18. The controller of claim 14, wherein the statistical information comprises a volume of traffic flowing from the first packet forwarding device to the destination IP address, and wherein the one or more processors are further configured to:
   determine a first attack path according to the volume of the traffic received by the transceiver flowing from the first packet forwarding device to the destination IP address, wherein the first attack path is an attack path, of at least one attack path, with a maximum volume of the traffic flowing to the destination IP address; and
   determine, according to the first attack path, a packet forwarding device closest to an attack source, wherein the packet forwarding device closest to the attack source is located on an SDN edge and on a side of a source address of the traffic on the first attack path flowing to the destination IP address.

19. The controller of claim 14, wherein the statistical data further comprises a load value of the first packet forwarding device, wherein before delivering the DDoS prevention policy to the second packet forwarding device, the one or more processors are further configured to determine a first diversion path according to the load value of the first packet forwarding device, wherein the first diversion path is a path with a minimum load between the second packet forwarding device and a cleaning device, wherein the first diversion path comprises the second packet forwarding device and the cleaning device, wherein the DDoS prevention policy is a dynamic diversion and cleaning response policy, wherein the dynamic diversion and cleaning response policy comprises indication information of the first diversion path, and wherein the indication information of the first diversion path instructs the second packet forwarding device to send, through the first diversion path, the traffic flowing to the destination IP address to the cleaning device for cleaning process.

20. The controller of claim 14, wherein before delivering the DDoS prevention policy to the second packet forwarding device, the one or more processors are further configured to determine a second diversion path according to an SDN topological relationship, wherein the second diversion path is a shortest path between the second packet forwarding device and a cleaning device, wherein the SDN topological relationship comprises a connection relationship between packet forwarding devices in the SDN system and a connection relationship between one or more packet forwarding devices and the cleaning device, wherein the DDoS prevention policy is a dynamic diversion and cleaning response policy, wherein the dynamic diversion and cleaning response policy comprises indication information of the second diversion path, and wherein the indication information of the second diversion path instructs the second packet forwarding device to send, through the second diversion path, the traffic flowing to the destination IP address to the cleaning device for cleaning process.

* * * * *